United States Patent [19]

Okushima

[11] Patent Number: 5,664,038
[45] Date of Patent: Sep. 2, 1997

[54] OPTICAL WAVEGUIDE STRUCTURE AS WELL AS OPTICAL WAVE BRANCHING UNIT, OPTICAL WAVE COMBINING UNIT, OPTICAL SELECTOR AND OPTICAL WAVE COMBINING AND BRANCHING UNIT

[75] Inventor: Hiroki Okushima, Kawasaki, Japan

[73] Assignee: Fujitsu Limited, Kanagawa, Japan

[21] Appl. No.: 628,524

[22] Filed: Apr. 5, 1996

[30] Foreign Application Priority Data

Jun. 27, 1995 [JP] Japan ................................. 7-161280

[51] Int. Cl.⁶ ........................................ G02B 6/28
[52] U.S. Cl. ......................... 385/50; 385/22; 385/31; 385/45
[58] Field of Search ........................... 385/50, 22, 24, 385/31, 44, 45, 39, 49, 94

[56] References Cited

U.S. PATENT DOCUMENTS 5,500,917  3/1996  Daniel et al. ........................ 385/94 X
5,515,464  5/1996  Sheem ............................... 385/50

FOREIGN PATENT DOCUMENTS 659142  3/1994  Japan .

*Primary Examiner*—Phan T. H. Palmer
*Attorney, Agent, or Firm*—Helfgott & Karas, P.C.

[57] ABSTRACT

The invention provides an optical waveguide structure suitable for use, for example, with a wavelength division multiplex transmission system for optical communication, which can be produced by a simple process and realizes a wavelength separation action of a high performance with a reduced propagation loss of light without provision of a gap between waveguides. The optical waveguide structure includes a first optical waveguide, a second optical waveguide including a pair of optical waveguides, and an intermediate optical waveguide for connecting the first optical waveguide and the second optical waveguide to each other. The intermediate optical waveguide is capable of propagating light of a high order mode therein.

24 Claims, 17 Drawing Sheets

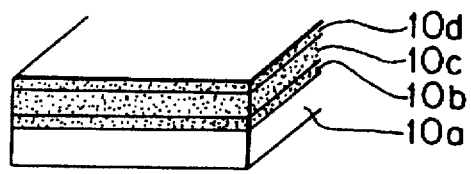
FIG. 3(a)   STEP P1: DEPOSITION OF POROUS GLASS FILM (FLAME DEPOSITION)
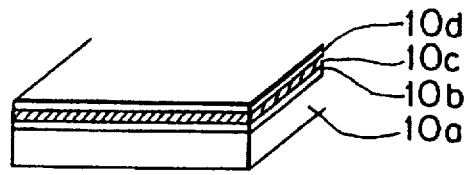
FIG. 3(b)   STEP P2: HEATING TO TRANSPARENCY
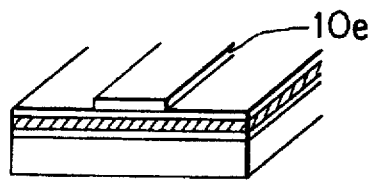
FIG. 3(c)   STEP P3: a-Si PATTERNING (REACTIVE ION ETCHING)
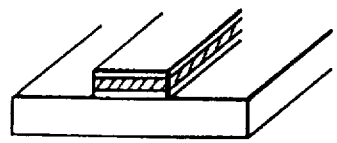
FIG. 3(d)   STEP P4: GLASS FILM PATTERNING (REACTIVE ION ETCHING)
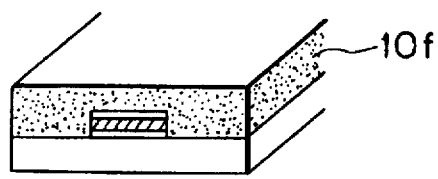
FIG. 3(e)   STEP P5: DEPOSITION OF POROUS GLASS (FLAME DEPOSITION)
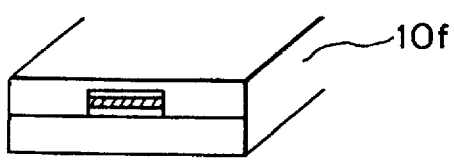
FIG. 3(f)   STEP P6: HEATING TO TRANSPARENCY F I G. 7
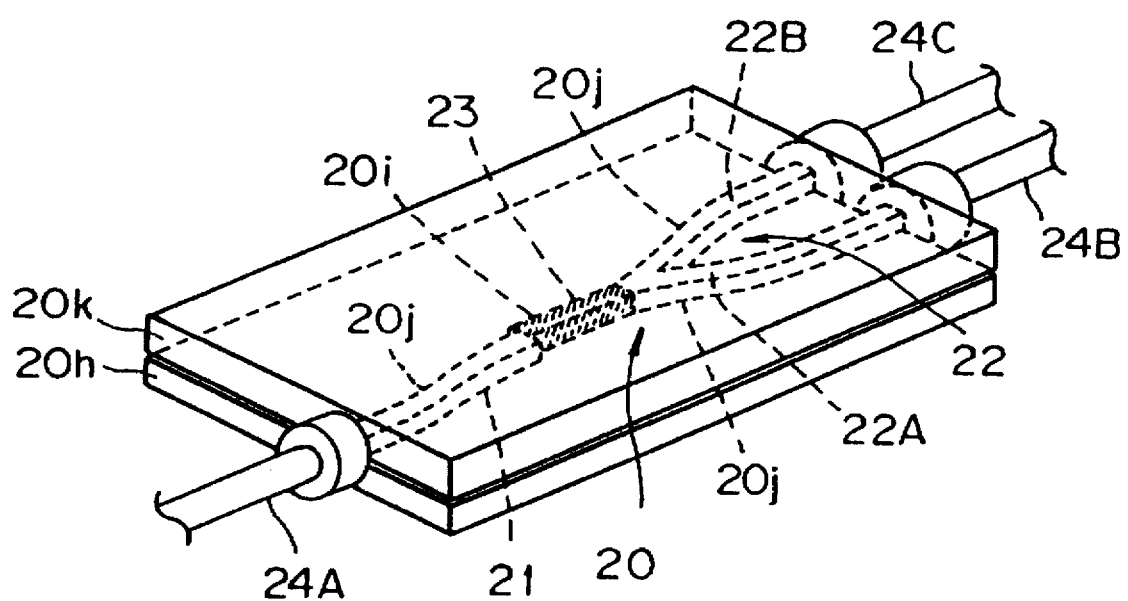

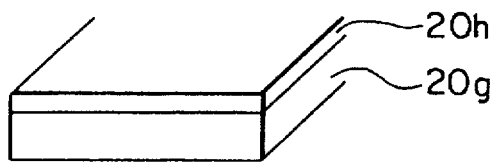

FIG. 8(a)   STEP P1: DEPOSITION OF POROUS GLASS FILM (FLAME DEPOSITION), HEATING TO TRANSPARENCY

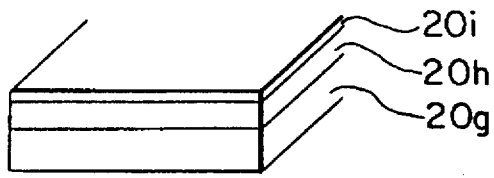

FIG. 8(b)   STEP P2: DEPOSITION OF HIGH REFRACTIVE INDEX CORE LAYER

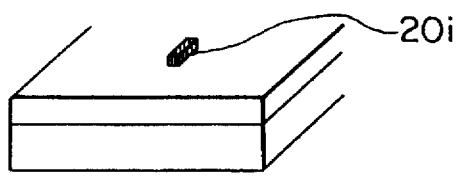

FIG. 8(c)   STEP P3: GLASS FILM PATTERNING (REACTIVE ION ETCHING)

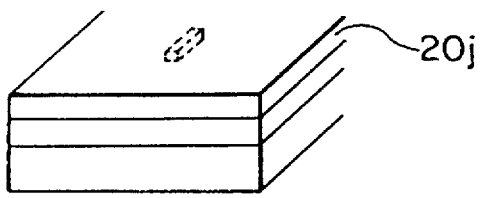

FIG. 8(d)   STEP P4: DEPOSITION OF POROUS GLASS (FLAME DEPOSITION)

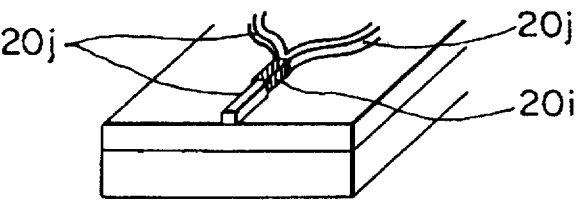

FIG. 8(e)   STEP P5: GLASS FILM PATTERNING (REACTIVE ION ETCHING)

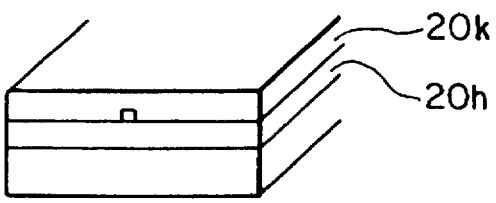

FIG. 8(f)   STEP P6: DEPOSITION OF POROUS GLASS FILM (FLAME DEPOSITION), HEATING TO TRANSPARENCY

OPTICAL WAVEGUIDE STRUCTURE AS WELL AS OPTICAL WAVE BRANCHING UNIT, OPTICAL WAVE COMBINING UNIT, OPTICAL SELECTOR AND OPTICAL WAVE COMBINING AND BRANCHING UNIT

BACKGROUND OF THE INVENTION

1. Field of the Invention

This invention relates to a structure of an optical waveguide as well as an optical wave branching unit, an optical wave combining unit, an optical selector and an optical wave combining and branching unit suitable for use, for example, with a wavelength division multiplex transmission system for optical communication.

2. Description of the Related Art

In ordinary optical communication, an optical waveguide module which functions as an optical passive device which branches or combines light on an optical waveguide is used, for example, to perform bidirectional communication or single directional communication of different signals or to perform wavelength division multiplex transmission to transmit a large amount of information in communication.

FIG. 16 shows an ordinary directional coupler as an optical waveguide module described above. Referring to FIG. 16, the directional coupler shown is formed, for example, by forming a waveguide layer on a substrate using a process of production including ion etching processing, high temperature processing and so forth. The directional coupler includes a first optical waveguide 101 and a second optical waveguide 102 each formed from a core layer having a high refractive index.

The directional coupler further includes an inter-waveguide gap 103 formed from a clad layer having a low refractive index.

When light is introduced into an input end (left end in FIG. 16) of the first optical waveguide 101, the skirt of an electric field of the light extends across the inter-waveguide gap 103 to the second optical waveguide 102, as seen from electric field distributions C and D in FIG. 16. By the electric field extending to the second optical waveguide 102, an electric field is induced also in the second optical waveguide 102.

Further, as is the light propagates on the waveguide, the electric field of the light transfers such that the height of the peak of the electric field in the second optical waveguide 102 increases while the height of the peak of the electric field in the first optical waveguide 101 decreases. Finally, the full power of the electric field transfers from the first optical waveguide 101 to the second optical waveguide 102 (the length of the waveguide required for the transfer of the full power is called complete coupling length or 100% coupling length).

Since the exudation of the electric field depends upon the wavelength, the degree at which the electric field is applied depends upon the wavelength, and also the degree (coupling efficiency) at which the electric field transfers depends upon the wavelength. In particular, as the wavelength increases, the exudation of the electric field from the waveguide increases, and consequently, the coupling efficiency increases. Accordingly, as the complete coupling length decreases as the wavelength increases.

It is to be noted that, if the length of the waveguide becomes longer than the complete coupling length, the power begins to transfer to the first optical waveguide 101 on the opposite side in accordance with the length of the waveguide, and the relationship in height between the peaks of the electric fields becomes reversed. Thereafter, the foregoing is repeated.

By the way, since light propagates so as to trace the peak of the power of an electric field, if light with which the waveguide length is equal to the complete coupling length is introduced into the first optical waveguide 101, then the light is outputted from the second optical waveguide 102. Further, if the waveguide length is longer than the complete coupling length, then the light transfers back and forth between the first optical waveguide 101 and the second optical waveguide 102 in accordance with the waveguide length.

The directional coupler shown in FIG. 16 is set so that, with respect to light of a wavelength λ1, the length over which the first optical waveguide 101 and the second optical waveguide 102 extend in parallel to each other is just equal to the complete coupling length. Consequently, the light of λ1 is outputted by 100% from the output end of the second optical waveguide 102. On the other hand, the directional coupler is set so that, with respect to light of another wavelength λ2, the length over which the first optical waveguide 101 and the second optical waveguide 102 extend in parallel to each other is equal to twice the complete coupling length. Consequently, the light of λ2 is outputted from the output end of the first optical waveguide 101.

With the directional coupler having the construction described above with reference to FIG. 16, if lights λ1 and λ2 are simultaneously inputted to the first optical waveguide 101, then in accordance with the wavelength characteristics of them, the light λ1 is outputted from the first optical waveguide 101 while the light λ2 is output:ted from the second optical waveguide It is to be noted that, by setting the directional coupler so that the light of λ1 transfers back and forth between the first optical waveguide 101 and the second optical waveguide 102 by an odd number of times, the difference between the wavelengths λ1 and λ2 can be set to a value near to a value which is actually required.

By the way, in the directional coupler described above, the gap between the waveguides located in the proximity of each other, the width of the waveguides, the difference in refractive index between the core and the clad and so forth are factors which determine the wavelength characteristic. Above all, the gap between the waveguides is an important factor.

FIG. 17 is a sectional view taken along line A–B of FIG. 16. Since the process of production of the directional coupler includes high temperature processing, the first optical waveguide 101 and the second optical waveguide 102 of the directional coupler are inclined to be fallen in directions in which they approach each other as seen in FIG. 17. In FIG. 17, each of the first optical waveguide 101 and the second optical waveguide 102 is indicated by a broken line when it is in a normal condition, but indicated by a solid line when it is in a fallen condition. Accordingly, the directional coupler described above has a subject to be solved in that, where the first optical waveguide 101 and the second optical waveguide 102 are in such dislocated conditions as described above, the wavelength characteristic is displaced, resulting in deterioration of the light branching characteristic of the directional coupler.

In the meantime, Japanese Patent Laid-Open Application No. Heisei 6-59142 discloses another technique wherein, in order to prevent such dislocation of a waveguide as described above, a glass embankment is formed in a spaced relationship by a desired distance on the outer side of a waveguide at a coupling portion of a directional coupler or a glass connection embankment is formed in the form of a ladder on the waveguide at the coupling portion.

Also the technique disclosed in Japanese Patent Laid-Open Application No. Heisei 6-59142, however, has a subject to be solved in that light to propagate leaks a little and has some influence on the branching characteristic of light.

SUMMARY OF THE INVENTION

It is an object of the present invention to provide an optical waveguide structure as well as an optical wave branching unit, an optical wave combining unit, an optical selector and an optical wave combining and branching unit which can be produced by a simple process of production and can realize a wavelength separation action of a high performance with the propagation loss of light reduced with a construction in which no gap is produced between waveguides.

In order to attain the object described above, according to an aspect of the present invention, there is provided an optical waveguide structure which comprises a first optical waveguide, a second optical waveguide including a pair of optical waveguides, and an intermediate optical waveguide for connecting the first optical waveguide and the second optical waveguide to each other, the intermediate optical waveguide being capable of propagating light of a high order mode therein.

The intermediate optical waveguide may have an optical waveguide width greater than that of the first optical waveguide.

Or, the intermediate optical waveguide may have a refractive index higher than that of the first optical waveguide.

Or else, the first optical waveguide and the intermediate optical waveguide may be arranged such that center axes thereof are not aligned with each other.

Otherwise, a connection end portion of the first optical waveguide to the intermediate optical waveguide may be formed so as to have an asymmetrical refraction index distribution.

The intermediate optical waveguide may be set so that a wavelength of one of two lights inputted to the intermediate optical waveguide from the first optical waveguide and having different wavelengths which has a longer one of the wavelengths is equal to N times a cycle in which the one light propagates meandering in the intermediate optical waveguide, N being an arbitrary integer, and the wavelength of the other light is equal to N−½ times the period in which the other light propagates meandering in the intermediate optical waveguide.

Or, the intermediate optical waveguide may be set so that a wavelength of one of two lights inputted to the intermediate optical waveguide from the first optical waveguide and having different wavelengths which has a shorter one of the wavelengths is equal to N times a cycle in which the one light propagates meandering in the intermediate optical waveguide, N being an arbitrary integer, and the wavelength of the other light is equal to N+½ times the period in which the other light propagates meandering in the intermediate optical waveguide.

In the optical waveguide structure, when combined light of light $\lambda 1$ and light $\lambda 2$ inputted to the first optical waveguide is introduced into the intermediate optical waveguide which can propagate light of a high order mode therein, the light $\lambda 1$ and the light $\lambda 2$ are branched from each other in accordance with the wavelength characteristics thereof by the intermediate optical waveguide. The thus branched lights $\lambda 1$ and $\lambda 2$ are outputted separately from each other from the pair of optical waveguides of the second optical waveguide. Consequently, the optical waveguide structure operates as an optical wave branching unit. On the other hand, when light $\lambda 1$ and light $\lambda 2$ inputted to the pair of optical waveguides of the second optical waveguide are introduced into the intermediate optical waveguide which can propagate light of a high order mode, the light $\lambda 1$ and the light $\lambda 2$ are combined by the intermediate optical waveguide. The thus combined light is outputted from the optical waveguide structure. Consequently, the optical waveguide structure operates as an optical wave combining unit.

Accordingly, the optical waveguide structure is advantageous in that, since the propagation loss of light is reduced and light of a higher order mode can be propagated in the intermediate optical waveguide and besides the optical waveguide structure can be produced by a simple process and eliminates the necessity of formation of a gap between waveguides, it can separate lights of different wavelengths from each other with a high degree of accuracy while suppressing the production cost. The optical waveguide structure is advantageous also in that it can separate lights of different wavelengths effectively and can be constructed as an optical wave branching unit of a high performance.

According to another aspect of the present invention, there is provided an optical wave branching unit which comprises an input optical waveguide, an output optical waveguide including a pair of optical waveguides, and an intermediate optical waveguide for connecting the input optical waveguide and the output optical waveguide to each other, the intermediate optical waveguide being capable of propagating light of a high order mode therein.

In the optical wave branching unit, when combined light of light $\lambda 1$ and light $\lambda 2$ inputted to the input optical waveguide is introduced into the intermediate optical waveguide which can propagate light of a high order mode therein, the light $\lambda 1$ and the light $\lambda 2$ are branched from each other in accordance with the wavelength characteristics thereof by the intermediate optical waveguide. The thus branched lights $\lambda 1$ and $\lambda 2$ are outputted separately from each other from the two optical waveguides of the output optical waveguide.

Accordingly, the optical wave branching unit is advantageous in that it can separate lights of different wavelengths from each other with a high degree of accuracy with a simple construction without provision of a gap between waveguides.

According to a further aspect of the present invention, there is provided an optical wave branching unit which comprises a plurality of optical wave branching unit modules each including an input optical waveguide, an out output optical waveguide including a pair of optical waveguides, and an intermediate optical waveguide for connecting the input optical waveguide and the output optical waveguide to each other, the intermediate optical waveguide being capable of propagating light of a high order mode therein, one of the pair of optical waveguides of a preceding stage one of two adjacent ones of the plurality of optical wave branching unit modules being connected to the input optical waveguide of a following stage one of the two adjacent optical wave branching unit modules.

In the optical wave branching unit, when combined light of different lights inputted to the input optical waveguide of the preceding stage side optical wave branching unit module is introduced into the intermediate optical waveguide of the preceding stage side optical wave branching unit module, the lights are branched from each other in accordance with wavelength characteristics thereof by the intermediate optical waveguide. The thus branched lights are outputted separately from each other from the two optical waveguides of the output optical waveguide of the preceding stage side optical wave branching unit module. The following stage side optical wave branching unit module receives the branched lights from one of the two optical waveguides of the output optical waveguide of the preceding stage side optical wave branching unit module. In the following stage side optical wave branching unit module, the received lights are introduced from the input optical waveguide into the intermediate optical waveguide, by which they are further branched from each other in accordance with the wavelength characteristics thereof. The thus branched lights are outputted separately from each other from the two optical waveguides of the output optical waveguide.

Accordingly, the optical wave branching unit is advantageous in that it can separate lights of different wavelengths from each other with a high degree of accuracy with a simple construction without provision of a gap between waveguides. The optical wave branching unit is further advantageous in that it can separate a plurality of lights having different wavelengths with a high degree of accuracy.

According to a still further aspect of the present invention, there is provided an optical wave combining unit which comprises an input optical waveguide formed from a pair of optical waveguides, an output optical waveguide, and an intermediate optical waveguide for connecting the input optical waveguide and the output optical waveguide to each other, the intermediate optical waveguide being capable of propagating light of a high order mode therein.

In the optical wave combining unit, light $\lambda 1$ and light $\lambda 2$ inputted from the two optical waveguides of the input optical waveguide to the intermediate optical waveguide are combined by the intermediate optical waveguide which can propagate light of a high order mode therein. The thus combined light is outputted from the output optical waveguide.

Accordingly, the optical wave combining unit is advantageous in that it can combine signal lights with a high degree of accuracy with the propagation loss of light reduced.

According to a yet further aspect of the present invention, there is provided an optical wave combining unit which comprises a plurality of optical wave combining unit modules each including an input optical waveguide formed from a pair of optical waveguides, an output optical waveguide, and an intermediate optical waveguide for connecting the input optical waveguide and the output optical waveguide to each other, the intermediate optical waveguide being capable of propagating light of a high order mode therein, the output optical waveguide of a preceding stage one of two adjacent ones of the plurality of optical wave branching unit modules being connected to one of the pair of optical waveguides of the input optical waveguide of a following stage one of the two adjacent optical wave branching unit modules.

In the optical wave combining unit, when different lights inputted from the two optical waveguides of the input optical waveguide of the preceding stage side optical wave combining unit module are introduced into the intermediate optical waveguide of the preceding stage side optical wave combining unit module, the lights are combined by the intermediate optical waveguide and the thus combined light is outputted from the output optical waveguide. The thus outputted combined light is introduced into one of the two optical waveguides of the input optical waveguide of the following stage side optical wave combining unit module. The light is then combined with combined light of different lights introduced into the other optical waveguide of the input optical waveguide of the following stage side optical wave combining unit module by the intermediate optical waveguide of the following stage side optical wave combining unit module. The thus combined light is outputted from the output optical waveguide of the following stage side optical wave combining unit module.

Accordingly, the optical wave combining unit is advantageous in that it can combine different lights with a high degree of accuracy with the propagation loss of light reduced. The optical wave combining unit is further advantageous in that it can combine a plurality of lights having different wavelengths.

According to a yet further aspect of the present invention, there is provided an optical wave combining and branching unit which comprises an optical wave branching unit module including an input optical waveguide, an output optical waveguide including a pair of optical waveguides, and an intermediate optical waveguide for connecting the input optical waveguide and the output optical waveguide to each other, the intermediate optical waveguide being capable of propagating light of a high order mode therein, and another optical wave combining unit module including an input optical waveguide formed from a pair of optical waveguides, an out put optical waveguide, and an intermediate optical waveguide for connecting the input optical waveguide and the output optical waveguide to each other, the intermediate optical waveguide being capable of propagating light of a high order mode therein, one of the pair of optical waveguides of the output optical waveguide of the optical wave branching unit module being connected to one of the pair of optical waveguides of the input optical waveguide of the optical wave branching unit module.

In the optical wave combining and branching unit, combined light of light $\lambda 1$ and light $\lambda 3$ inputted from the input optical waveguide in the optical wave branching unit module on the preceding stage side is, in the optical wave branching unit module on the preceding stage side, branched into the light $\lambda 1$ and the light $\lambda 3$ in accordance with the wavelength characteristics of the lights by the intermediate optical waveguide. Of the branched lights $\lambda 1$ and $\lambda 3$, the light $\lambda 1$ is outputted from that one of the two optical waveguides of the output optical waveguide which is connected to a receiving station while the light $\lambda 3$ is outputted from one of the two optical wave guides of the input optical waveguide of the optical wave combining unit module on the following stage side via the intermediate optical waveguide. Then, in the optical wave combining unit module on the following stage side, the light $\lambda 3$ received from the optical wave branching unit module on the preceding stage side and light $\lambda 2$ inputted from a transmitting station connected to the other optical waveguide of the input optical waveguide are combined by the intermediate optical waveguide. The combined light is outputted from the output optical waveguide.

Accordingly the optical wave combining and branching unit is advantageous in that it can combine or branch lights of different wavelengths with a high degree of accuracy with the propagation loss of light reduced. The optical wave combining and branching unit is further advantageous in that an optical multiplex transmission system or an optical branching insertion transmission system which can communicate with a high degree of accuracy can be realized using the optical wave combining and branching unit.

According to a yet further aspect of the present invention, there is provided an optical selector which comprises a first optical waveguide, a second optical waveguide including a pair of optical waveguides one of which serves as an input side optical waveguide and the other one of which serves as an output side optical waveguide, and an intermediate optical waveguide for connecting the first optical waveguide and the second optical waveguide to each other, the intermediate optical waveguide being capable of propagating light of a high order mode therein.

In the optical selector, light $\lambda 1$ inputted to the first optical waveguide passes the intermediate optical waveguide and is outputted from the output side optical waveguide of the second optical waveguide whereas light $\lambda 2$ inputted to the input side optical waveguide of the second optical waveguide passes the intermediate optical waveguide and is outputted from the first optical waveguide.

Accordingly, with the optical selector, since the propagation loss of light is reduced and a mutual influence of signal lights of the opposite directions is eliminated, the optical selector can select a desired wavelength with a high degree of accuracy. Consequently, the optical selector is advantageous in that an optical bidirectional transmission system which can communicate with a high degree of accuracy can be realized using the optical selector.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 3(a) to 3(f) are schematic partial perspective views illustrating different steps of a process of production of the optical waveguide of FIG. 1;

FIG. 7 is a schematic perspective view showing the optical waveguide of FIG. 6 mounted on a wavelength division multiplex transmission system;

FIGS. 8(a) to 8(f) are schematic partial perspective views illustrating different steps of a process of production of the optical waveguide of FIG. 6;

DESCRIPTION OF THE PREFERRED EMBODIMENTS a. Basic Structure of optical waveguide Module a1. First Form Referring first to FIG. 1, there is shown an optical waveguide as a first form of a basic structure of an optical waveguide module to which the present invention is applied. The optical waveguide as an optical waveguide module is generally denoted at 10 and is generally constructed such that it branches light and light $\lambda 2$ introduced into it from another same optical waveguide and outputs them from different optical waveguides. To this end, the optical waveguide includes a first optical waveguide 11 serving as an input waveguide, a second optical waveguide (output waveguide) 12 including a pair of optical waveguides and 12B, and an intermediate optical waveguide 13. The intermediate optical waveguide 13 connects the first optical waveguide 11 and the second optical waveguide 12 to each other and functions as a wavelength separation section which can propagate light of a high order mode therein.

Figure 1:
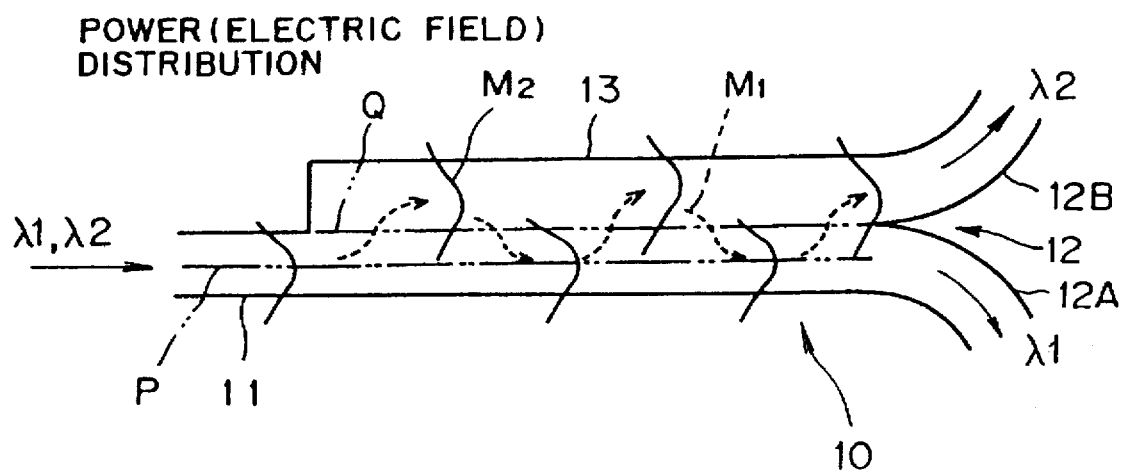
FIG. 1 is a schematic view of an optical waveguide as a first form of a basic structure of an optical waveguide module to which the present invention is applied.

In particular, in the intermediate optical waveguide 13, electric field peaks corresponding to the lights $\lambda 1$ and $\lambda 2$ are produced as seen in FIG. 1, and the lights $\lambda 1$ and $\lambda 2$ propagate such that they trace the respective electric field peaks. It is to be noted that, in FIG. 1, only a meandering curve M1 along which the light $\lambda 2$ propagates and an electric field peak M2 corresponding to the light $\lambda 2$ are illustrated.

The intermediate optical waveguide 13 is formed such that the optical waveguide width thereof is greater than the optical waveguide width of the first optical waveguide 11, and the first optical waveguide 11 and the intermediate optical waveguide 13 are arranged such that center axes P and Q thereof may not be aligned with each other.

In particular, the first optical waveguide 11 and the intermediate optical waveguide 13 are arranged such that the center axis P of the first optical waveguide 11 does not coincide with the center axis Q of the intermediate optical waveguide 13. It is to be noted that, in this instance, a side wall of the first optical waveguide 11 on the optical waveguide 12A side and a side wall of the intermediate optical waveguide 13 on the optical waveguide 12A side are connected in flush with each other.

Further, the length of the intermediate optical waveguide 13 is set such that, when the wavelengths $\lambda 1$ and $\lambda 2$ of lights inputted from the first optical waveguide 11 satisfy the relationship of $\lambda 1 > \lambda 2$, the wavelength $\lambda 1$ is equal to N (N is an arbitrary integer) times the cycle in which the light $\lambda 1$ propagates meandering in the intermediate optical waveguide 13 while the wavelength λ2 is equal to N−(½) times the cycle in which the light λ2 propagates meandering in the intermediate optical waveguide 13, or such that, when the wavelengths λ1 and λ2 of lights inputted from the first optical waveguide 11 satisfy the relationship of λ1<λ2, the wavelength λ1 is equal to N (N is an arbitrary integer) times the cycle in which the light λ1 propagates meandering in the intermediate optical waveguide 13 while the wavelength λ2 is equal to N+(½) times the cycle in which the light λ2 propagates meandering in the intermediate optical waveguide 13.

Figure 2:
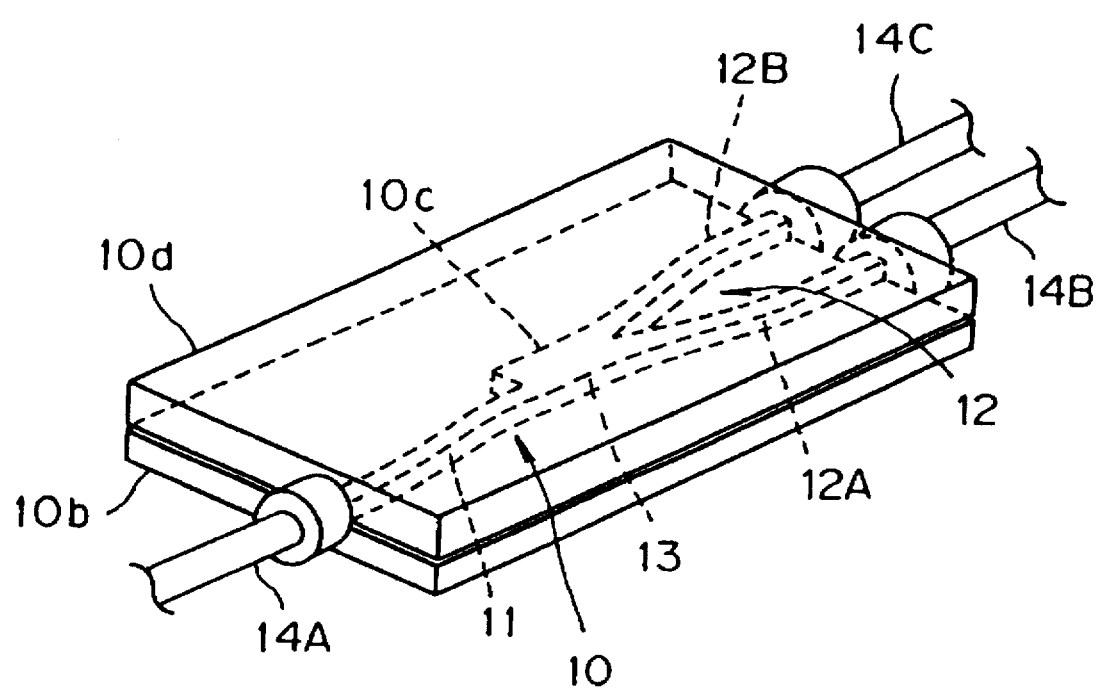
FIG. 2 is a schematic perspective view showing the optical waveguide of FIG. 1 mounted on a wavelength division multiplex transmission system.

The optical waveguide module constructed in such a manner as described above can be mounted, for example, on a wavelength division multiplex transmission system as a measure for transmission of a large amount of information for bidirectional communication and so forth as shown in FIG. 2. Referring to FIG. 2, the optical waveguide module 10 is formed from a core layer 10c located between a clad layer 10b and another clad layer 10d. In particular, the first optical waveguide 11, the second optical waveguide 12 and the intermediate optical waveguide 13 shown in FIG. 1 are formed from the uniform core layer 10c. A terminal end portion of the first optical waveguide 11 is connected to an optical fiber cable 14A, and terminal end portions of the second optical waveguide 12 are connected to a pair of optical fiber cables 14B and 14C.

The optical waveguide 10 described above is produced, for example, by such a process as illustrated in FIGS. 3(a) to 3(f).

In particular, upon production of the optical waveguide 10, first at step P1, a clad layer 10b, a core layer 10c and another clad layer 10d are deposited in this order on a silicon substrate 10a by a flame deposition method to form an optical waveguide film of porous quartz glass as shown in FIG. 3(a). Here, the flame deposition method is a technique wherein raw material gas such as silicon dichloride is hydrolyzed in flame of an oxyhydrogen burner using gas such as argon gas to produce silicon dioxide in the form of powder and the silicon dioxide powder is sprayed to a substrate so that it is deposited on the substrate. It is to be noted that, at an initial stage of the flame deposition step described above, only silicon dioxide may be sprayed, and there after, titanium dioxide may be mixed into silicon dioxide so that a desired core refractive index pattern may be obtained.

Then, at step P2, the optical waveguide films 10b, 10c and 10d of porous quartz glass formed at step P1 are processed in a high temperature to obtain a transparent optical waveguide film as seen in FIG. 3(b).

Further, at step P3, amorphous silicon (a-Si) 10e is vapor deposited by sputtering as seen in FIG. 3(c), and then realist is applied to the amorphous silicon 10e and a waveguide pattern is formed using a waveguide mask. Thereafter, a pattern is formed on the amorphous silicon by photolithography. Further, at step P4, using the amorphous silicon as a mask, reactive ion etching is performed to form the glass optical waveguide films 10b, 10c and 10d into a waveguide as seen in FIG. 3(d).

Finally, at steps P5 and P6, a clad layer 10f is deposited by CVD (chemical vapor deposition), flame deposition or the like to produce an optical waveguide 10 as seen in FIGS. 3(e) and 3(f).

In the optical waveguide 10 as a first form of the basic structure of the optical waveguide module having such a construction as described above, light propagates in the following manner.

In particular, lights λ1 and λ2 inputted from the optical fiber cable 14A are branched by the optical waveguide 10. The thus branched lights λ1 and λ2 are outputted from the optical fiber cables 14B and 14C, respectively.

In the optical waveguide 10, when the light λ1 and the light λ2 inputted to the first optical waveguide 11 are first introduced into the intermediate optical waveguide 13 having an optical waveguide width greater than that of the first optical waveguide 11 as seen in FIG. 1, electric field peaks corresponding to the light λ1 and the light λ2 are produced, for example, as seen in FIG. 1, in the intermediate optical waveguide 13. The light λ1 and the light λ2 propagate meandering in the intermediate optical waveguide 13 such that they may trace the electric field peaks.

Figure 4:
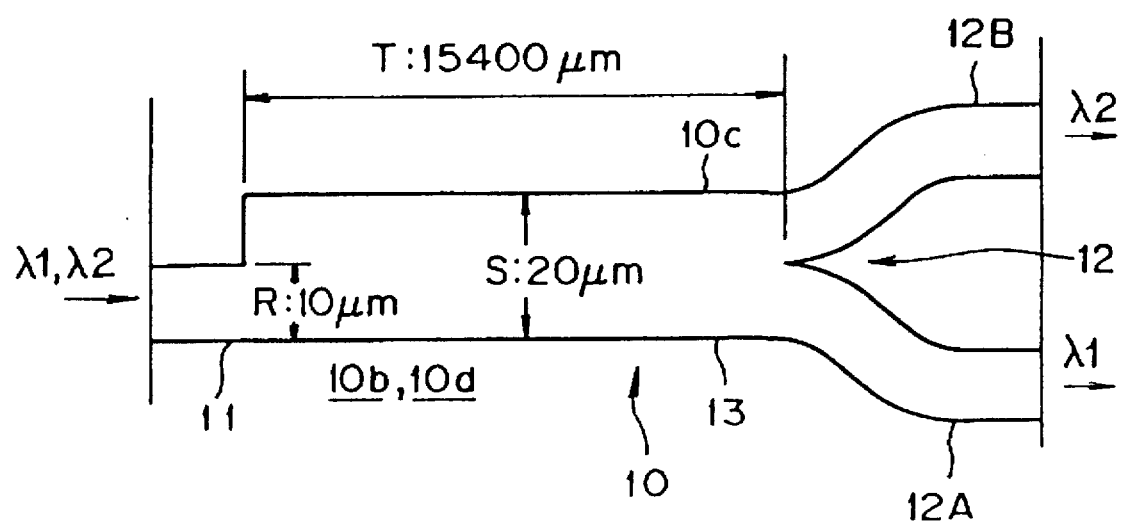
FIG. 4 is a schematic view showing an example of dimensions of the optical waveguide of FIG. 1.
Figure 5:
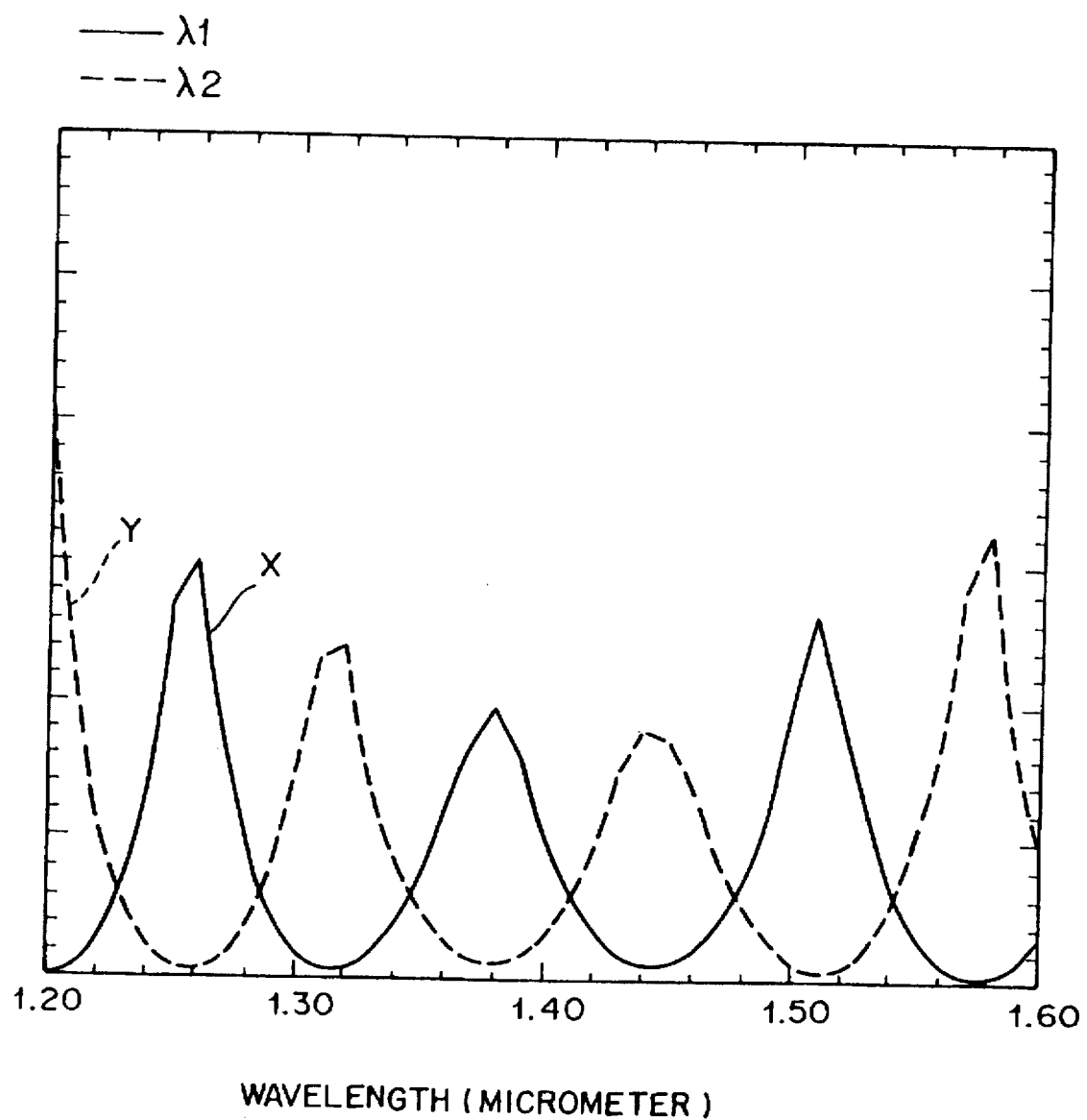
FIG. 5 is a diagram illustrating light loss characteristics of the optical waveguide of FIG. 4 with respect to the wavelength.

As described above, the intermediate optical waveguide 13 realizes its wavelength separation action (filter effect) by setting the length thereof in accordance with the positions of the peaks of the electric fields of lights of a first order mode so that lights outputted from the second optical waveguide 12 are branched in accordance with wavelength characteristics thereof and the light λ1 is outputted from the optical waveguide 12A of the second optical waveguide while the light λ2 is outputted from the optical waveguide 12B of the second optical waveguide 12.

Where the optical waveguide 10 described above is designed so as to have such a scale as seen, for example, in FIG. 4, the lights λ1 and λ2 outputted from the optical waveguides 12A and 12B of the second optical waveguide 12 can have such loss characteristics of light with respect to the wavelength as seen, for example, in FIG. 5.

In particular, the optical waveguide 10 shown in FIG. 4 is formed such that the optical waveguide width R of the first optical waveguide 11 is approximately 10 μm, the optical waveguide width S of the intermediate optical waveguide 13 is 20 μm, the length T of the intermediate optical waveguide 13 is approximately 15,400 μm, the refractive index of the core layer 10c is approximately 1.4485, and the refractive indices of the clad layers 10b and 10d are approximately 1.445.

In this instance, the loss characteristic with respect to the wavelength of the light λ1 outputted from the optical waveguide 12A of the second optical waveguide 12 is such as indicated by a solid line X in FIG. 5, and the loss characteristic with respect to the wavelength of the light λ2 outputted from the optical waveguide 12B of the second optical waveguide 12 is such as indicated by a broken line Y in FIG. 5. Consequently the λ1 light λ1 from the optical waveguide 12A of the second optical waveguide 12 and the light λ2 from the optical waveguide 12B of the second optical waveguide 12 can be outputted with the loss characteristics reverse to each other.

In this manner, with the optical waveguide 10 as a first form of the basic structure of the optical waveguide module of the present invention, since the intermediate optical waveguide 13 is formed such that the optical waveguide width thereof is greater than that of the first optical waveguide 11 and the first optical waveguide 11 and the intermediate optical waveguide 13 are arranged such that the center axes thereof are not aligned with each other, the propagation loss of light can be reduced and high order mode light can be propagated in the intermediate optical waveguide 13. Further, since the length of the intermediate optical waveguide 13 is set such that the wavelength of one of the light λ1 and the light λ2 having different wavelengths which has a longer wavelength is equal to N (N is an arbitrary integer) times the cycle in which the light of the longer wavelength propagates meandering in the intermediate optical waveguide 13 while the wavelength of the other light is equal to N−(½) times the cycle in which the light propagates meandering in the intermediate optical waveguide 13 or such that the wavelength of one of the light λ1 and the light λ2 which has a shorter wavelength is equal to N (N is an arbitrary integer) times the cycle in which the light propagates meandering in the intermediate optical waveguide 13 while the wavelength of the other light is equal is to N−(½) times the cycle in which the light propagates meandering in the intermediate optical waveguide 13, the lights of the different wavelengths can be separated from each other effectively. Consequently, the optical waveguide 10 is advantageous in that it can be constructed as an optical wave branching unit hating a high degree of accuracy in optical branching.

Further, the optical waveguide 10 can be produced by such a simple process as described hereinabove with reference to FIGS. 3(a) to 3(f), and no gap need be produced between the waveguides. Consequently, the optical waveguide 10 is advantageous also in that the lights of the different wavelengths can be separated from each other with a high degree of accuracy while suppressing the production cost.

a2. Second Form

Figure 6:
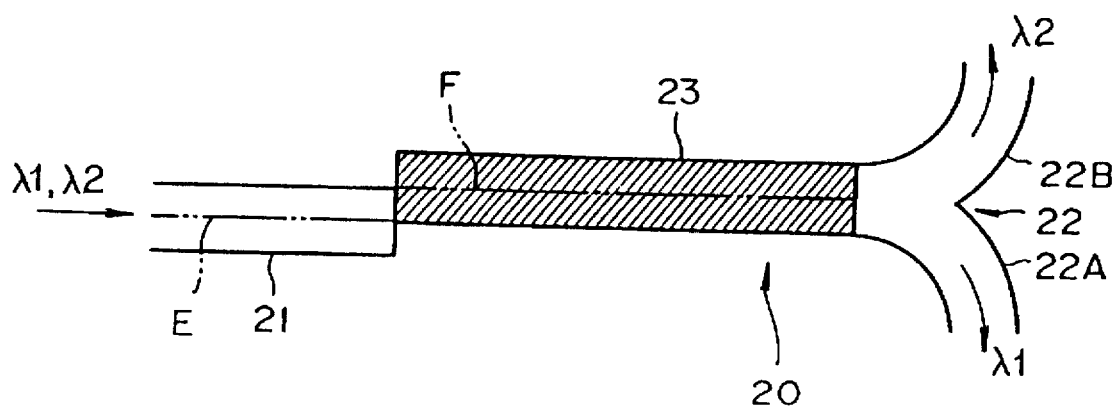
FIG. 6 is a schematic view of another optical waveguide as a second form of the basic structure of the optical waveguide module to which the present invention is applied.

Referring now to FIG. 6, there is shown an optical waveguide as a second form of the basic structure of the optical waveguide module to which the present invention is applied. The optical waveguide as an optical waveguide module is generally denoted at 20 and is designed so as to branch light λ1 and light λ2 inputted thereto from a same single optical waveguide and outputs the lights λ1 and λ2 from separate optical waveguides. To this end, the optical waveguide 20 includes a first optical waveguide 21 serving as an input waveguide, a second optical waveguide (output waveguide) 22 formed from a pair of optical waveguides 22A and 22B, and an intermediate optical waveguide 23. The intermediate optical waveguide 23 connects the first optical waveguide 21 and the second optical waveguide to each other and functions as a wavelength separation section in which light of a high order mode can propagate.

Further, the intermediate optical waveguide and the first optical waveguide 21 are formed such that the refractive index of the intermediate optical waveguide 23 is higher than that of the first optical waveguide 21, and are disposed such that center axes E and F thereof are not aligned with (are displaced from) each other.

In other words, the first optical waveguide 21 and the intermediate optical waveguide 23 are disposed such that the center axis E of the first optical waveguide 21 does not coincide with the center axis F of the intermediate optical waveguide 23.

Further, the length of the intermediate optical waveguide 23 is set such that, when the wavelengths λ1 and λ2 of the lights inputted from the first optical waveguide 21 satisfy the relationship of λ1>λ2, the wavelength λ1 is equal to N (N is an arbitrary integer) times the cycle in which the light λ1 propagates meandering in the intermediate optical waveguide 23 while the wavelength λ2 is equal to N−(½) times the cycle in which the light λ2 propagates meandering in the intermediate optical waveguide 23, or such that, when the wavelengths λ1 and λ2 of the light inputted from the first optical waveguide 21 satisfy the relationship of λ1>λ2, the wavelength λ1 is equal to N (N is an arbitrary integer) times the cycle in which the light propagates meandering in the intermediate optical waveguide 23 while the wavelength λ2 is equal to N+(½) times the cycle in which the light λ2 propagates meandering in the intermediate optical waveguide 23.

The optical waveguide module constructed in such a manner as described above can be mounted, for example, on a wavelength division multiplex transmission system as a measure for transmission of a large amount of information for bidirectional communication and so forth as shown in FIG. 7. Referring to FIG. 7, the optical waveguide 20 is formed from a core layer 20i of a high refractive index and a core layer 20j of an ordinary refractive index both located between a clad layer 20h and another clad layer 20k. A terminal end portion of the first optical waveguide 21 is connected to an optical fiber cable 24A, and terminal end portions of the second optical waveguide 22 are connected to a pair of optical fiber cables 24B and 24C.

The optical waveguide 20 described above is produced, for example, by such a process as illustrated in FIGS. 8(a) to 8(f).

In particular, upon production of the optical waveguide 20 having the high refractive index portion, first at step P1, a clad layer 20h is first deposited on a silicon substrate 20g and heated to a high temperature so as to be converted into glass by a flame deposition method similar to that described hereinabove with reference to FIG. 3(a) to form a base clad layer 20h as shown in FIG. 8(a).

Then, at step P2, silicon dioxide doped with titanium dioxide as a dopant is deposited on the base clad layer 20h by a flame deposition method to form a core layer 20i of a high refractive index as seen in FIG. 8(b). It is to be noted that, while this layer later makes the high refractive index portion and has a refractive index increased by doping it with titanium dioxide by a rather large amount as a dopant, germanium dioxide may be used as a dopant instead.

Further, at step P3, the core layer 20i of the high refractive index is removed by etching leaving the high refractive index portion as seen in FIG. 8(c). It is to be noted that, upon etching, amorphous silicon is sputtered first, and then a resist is applied. Then, a waveguide pattern is transferred using a waveguide mask, and the amorphous silicon is etched. Then, using the pattern of the amorphous silicon, the core layer 20i of the high refractive index is etched by a RIE (reactive ion etching) method or the like.

Finally, at step P4, a core layer 20j of an ordinary refractive index is deposited on the core layer 20i of a high refractive index and the clad layer 20h as seen in FIG. 8(d) by a flame deposition method, and at step P5, the core layer 20j is etched to form a waveguide pattern 20j of the ordinary refractive index as seen in FIG. 8(e), whereafter a clad layer 20k is deposited on the core layer 20j and the clad layer 20h at step P6 as shown in FIG. 8(f) and heated to a high temperature so as to be converted into glass.

The optical waveguide 20 as a second form of the basic structure of the optical waveguide module having such a construction as described above operates in the following manner.

In particular, combined signal light of lights λ1 and λ2 inputted from the optical fiber cable 24A is branched by the optical waveguide 20. The thus branched lights λ1 and λ2 are outputted from the optical fiber cables 24B and 24C, respectively.

In the optical waveguide 20, when the light λ1 and the light λ2 inputted to the first optical waveguide 21 are first introduced into the intermediate optical waveguide 23 having a refractive index higher than that of the first optical waveguide 21 as seen in FIG. 6, then light of a high order mode is generated similarly as described hereinabove with reference to FIG. 1.

In particular, when the lights λ1 and λ2 are introduced into the intermediate optical waveguide 23, electric field peaks corresponding to the light λ1 and the light λ2 are produced similarly, for example, as seen in FIG. 1, in the intermediate optical waveguide 23. The light λ1 and the light λ2 propagate meandering in the intermediate optical waveguide 23 such that they may trace the respective electric field peaks.

As described above, the intermediate optical waveguide 23 realizes its wavelength separation action (filter effect) by setting the length thereof in accordance with the positions of the peaks of the electric fields of lights of a first order mode so that light outputted from the second optical waveguide 22 is branched in accordance with wavelength characteristics thereof and the light λ1 is outputted from the optical waveguide 22A of the second optical waveguide 22 while the light λ2 is outputted from the optical waveguide 22B of the second optical waveguide 22.

It is to be noted that also the optical waveguide 20 shown in FIG. 6 can be provided with light loss characteristics with respect to the wavelength similar to those described hereinabove with reference to FIG. 5 by such setting of the refractive indices of the first optical waveguide 21 and the second optical waveguide 22 described above.

In this manner, with the optical waveguide 20 as a second form of the basic structure of the optical waveguide module of the present invention, since the intermediate optical waveguide 23 and the first optical waveguide 21 are formed such that the refractive index of the intermediate optical waveguide 23 is higher than that of the first optical waveguide 21 and are arranged such that the center axes thereof are not aligned with each other, the propagation loss of light can be eliminated and high order mode light can be propagated in the intermediate optical waveguide 23. Further, since the length of the intermediate optical waveguide 23 is set such that the wavelength of one of the light λ1 and the light λ2 having different wavelengths which has a longer wave length is equal to N (N is an arbitrary integer) times the cycle in which the light of the longer wavelength propagates meandering in the intermediate optical waveguide 23 while the wavelength of the other light is equal to N–(½) times the cycle in which the light propagates meandering in the intermediate optical waveguide 23 or such that the wavelength of one of the light λ1 and the light λ2 which has a shorter wavelength is equal to N (N is an arbitrary integer) times the cycle in which the light propagates meandering in the intermediate optical waveguide 23 while the wavelength of the other light is equal is to N+(½) times the cycle in which the light propagates meandering in the intermediate optical waveguide 23, the lights of the different wavelengths can be separated from each other effectively. Consequently, the optical waveguide 20 is advantageous in that it can be constructed as an optical wave branching unit having a high accuracy in optical branching.

Further, the optical waveguide 20 can be produced by such a simple process as described hereinabove with reference to FIGS. 8(a) to 8(f), and no gap need be produced between the waveguides. Consequently, the optical waveguide 20 is advantageous also in that the lights of the different wavelengths can be separated from each other with a high degree of accuracy while suppressing the production cost.

a3. Third Form

Figure 9:
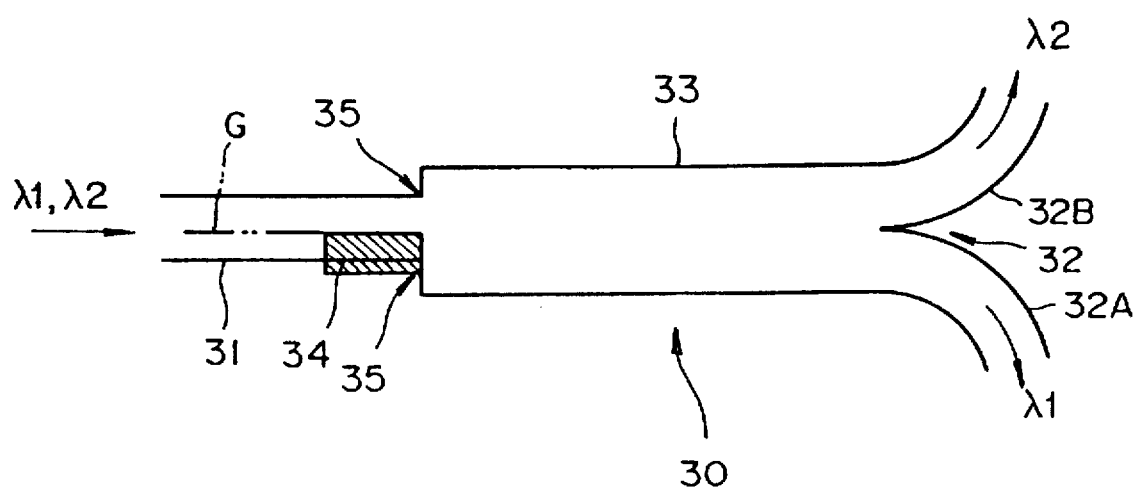
FIG. 9 is a schematic view of a further optical waveguide as a third form of the basic structure of the optical waveguide module to which the present invention is applied.

Referring now to FIG. 9, there is shown in schematic view an optical waveguide as a third form of the basic structure of the optical waveguide module to which the present invention is applied. The optical waveguide shown as an optical waveguide module is generally denoted at 30 and is designed so as to branch light λ1 and light λ2 inputted thereto from a same single optical waveguide and output the lights λ1 and λ2 from separate optical waveguides. To this end, the optical waveguide 30 includes a first optical waveguide 31 serving as an input waveguide, a second optical waveguide (output waveguide) 32 formed from a pair of optical waveguide 32A and 32B, and an intermediate optical waveguide 33. The intermediate optical waveguide 33 connects the first optical waveguide 31 and the second optical waveguide 32 to each other and functions as a wavelength separation section in which light of a high order mode can propagate.

Further, the intermediate optical waveguide 33 and the first optical waveguide 31 are formed such that the optical waveguide width of the intermediate optical waveguide 33 is greater than that of the first optical waveguide 31, and the first optical waveguide 31 has, on a side wall of a connection end portion 35 thereof to the intermediate optical waveguide 33 (on the same side as the optical waveguide 32A of the second optical waveguide 32), a high refraction index region 34 formed from a substance having a light propagation characteristic of a high refractive index.

Figure 11:
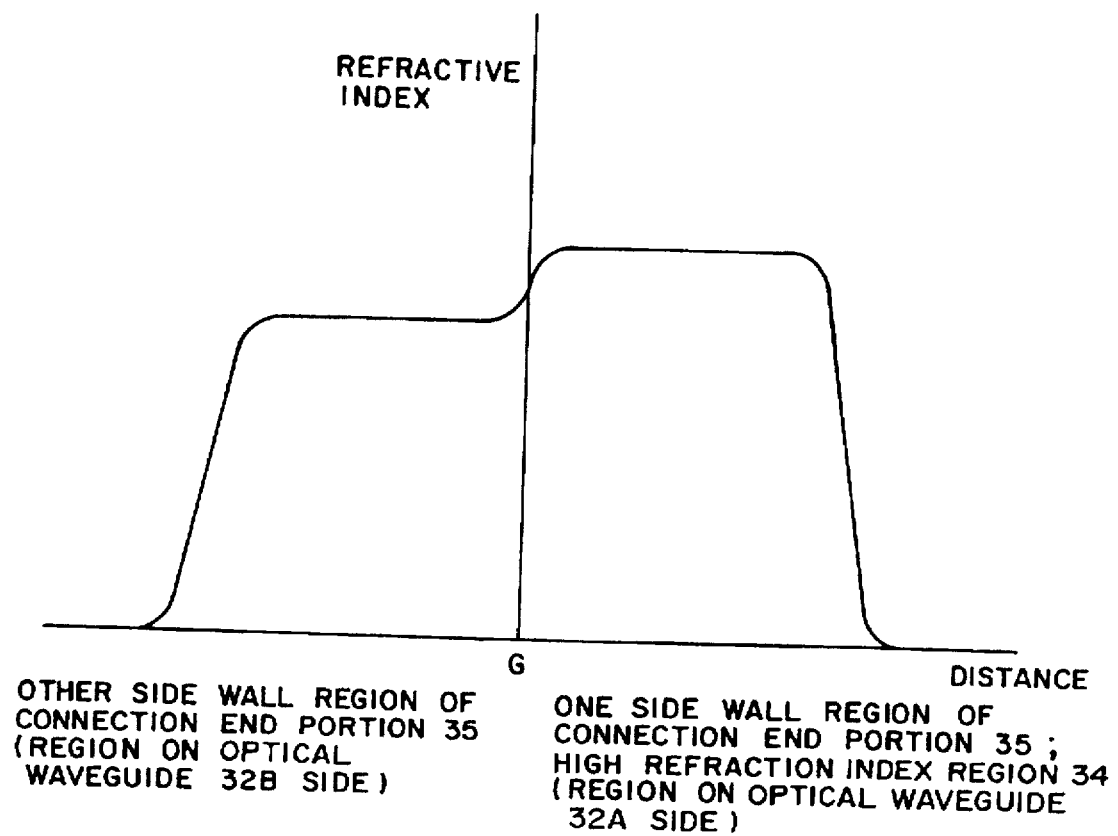
FIGS. 11 and 12 are graphs showing different examples of an asymmetrical refraction index distribution at a connection end portion of the optical waveguide of FIG. 10.
Figure 12:
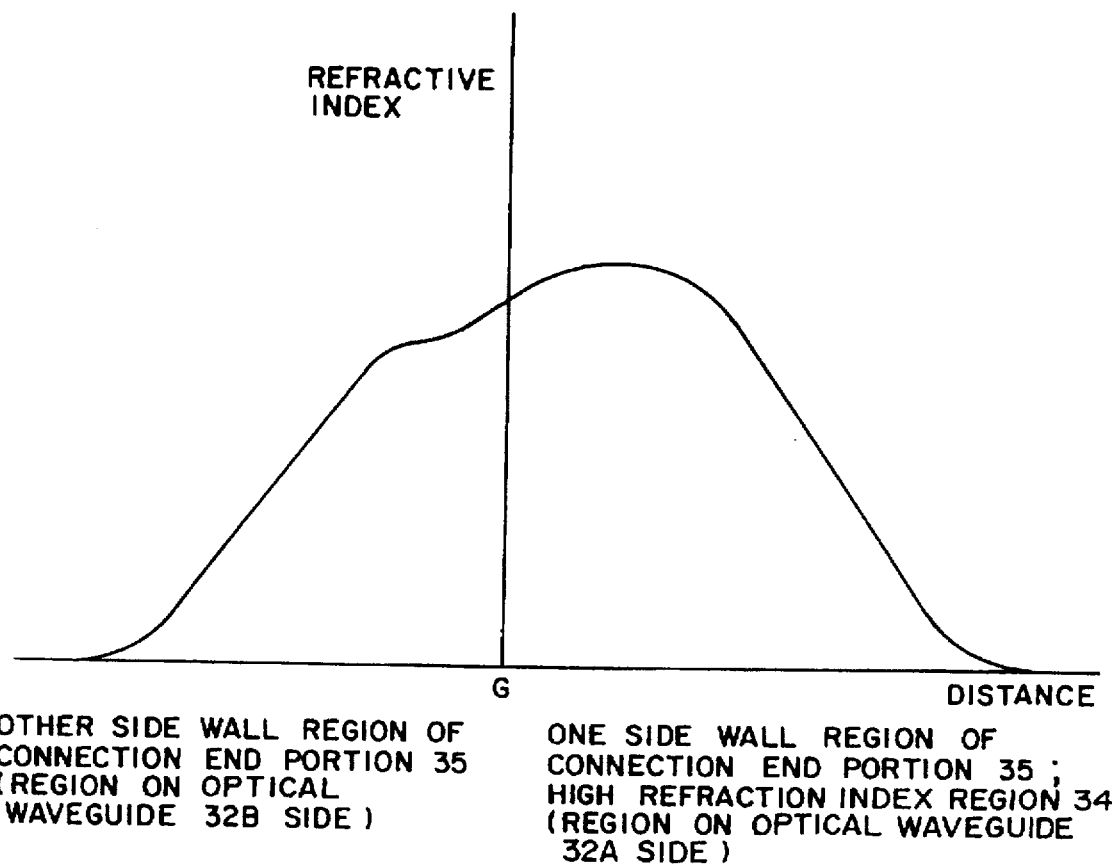

In particular, the refractive index of the connection end portion 35 has an asymmetrical refractive index distribution with respect to a central portion G thereof such that the refractive index of the high refraction index region 34 (region on the same side as the optical waveguide 32A of the second optical waveguide 32) is higher than the refractive index of the other region of the other side wall of the connection end portion 35 (region on the same side as the optical wavelength 32B of the second optical waveguide 32) as seen, for example, in FIG. 11 or 12. Due to the construction, high order mode light propagates in the intermediate optical waveguide 33.

It is to be noted that also the optical waveguide 30 described above can be produced by a similar production process as that described hereinabove. In this instance, however, titanium dioxide is doped into the connection end portion 35 of the first optical waveguide 31 to the intermediate optical waveguide 33 so that the refractive index distribution of the connection end portion 35 may be asymmetrical as described above.

Further, the length of the intermediate optical waveguide 33 is set such that, when the wavelengths λ1 and λ2 of the lights inputted from the first optical waveguide 31 satisfy the relationship of λ1 ) λ2, the wavelength λ1 is equal to N (N is an arbitrary integer) times the cycle in which the light λ1 propagates meandering in the intermediate optical waveguide 33 while the wavelength λ2 is equal to N–(½) times the cycle in which the light λ2 propagates meandering in the intermediate optical waveguide 33, or such that, when the wavelengths λ1 and λ2 of the light inputted from the first optical waveguide 31 satisfy the relationship of λ1<λ2, the wavelength λ1 is equal to N (N is an arbitrary integer) times the cycle in which the light λ1 propagates meandering in the intermediate optical waveguide 33 while the wavelength λ2 is equal to N+(½) times the cycle in which the light λ2 propagates meandering in the intermediate optical waveguide 33.

Figure 10:
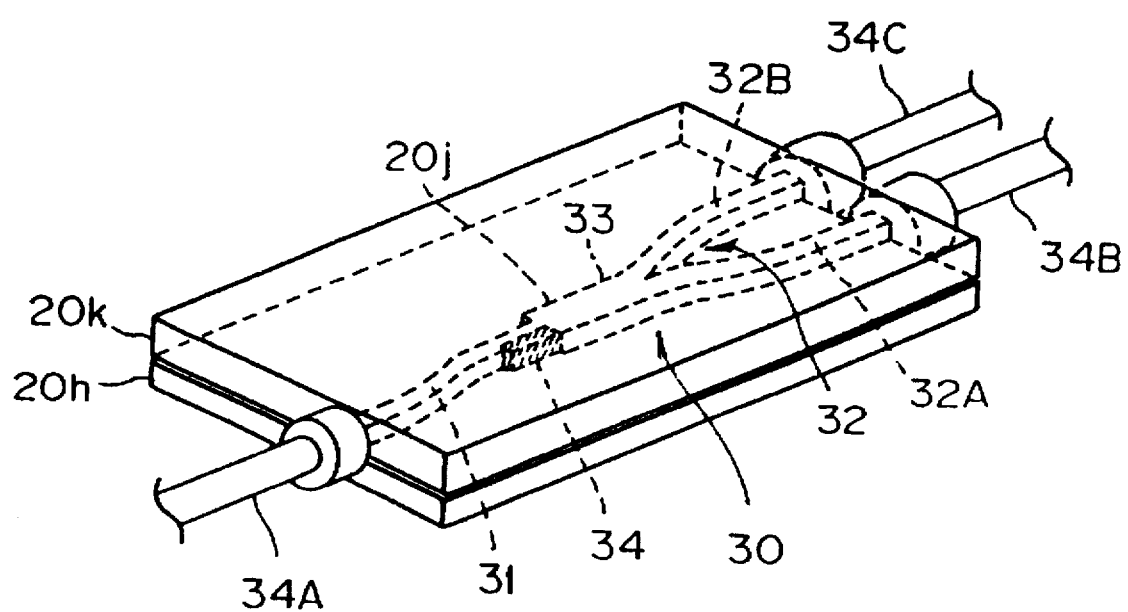
FIG. 10 is a schematic perspective view showing the optical waveguide of FIG. 9 mounted on a wavelength division multiplex transmission system.

The optical waveguide module 30 constructed in such a manner as described above can be mounted, for example, on a wavelength division multiplex transmission system as a measure for transmission of a large amount of information bidirectional communication and so forth as shown in FIG. 10. Referring to FIG. 10, the optical waveguide 30 is formed from a core layer 20j located between a clad layer 20h and another clad layer 20k. In other words, the first optical waveguide 31, the second optical waveguide 32 and the intermediate optical waveguide 33 shown in FIG. 10 are formed from the uniform core layer 20j. A terminal end portion of the first optical waveguide 31 is connected to an optical fiber cable 34A, and terminal end portions of the second optical waveguide 32 are connected to a pair of optical fiber cables 34B and 34C.

in the optical waveguide 30 as a third form of the basic structure of the optical waveguide module having such a construction as described above, light propagates in the following manner.

In particular, lights $\lambda 1$ and $\lambda 2$ inputted from the optical fiber cable 34A are branched by the optical waveguide 30. The thus branched lights $\lambda 1$ and $\lambda 2$ are outputted from the optical fiber cables 34B and 34C, respectively.

in the optical waveguide 30, since the connection end portion 35 of the first optical waveguide 31 to the intermediate optical waveguide 33 is constructed as a connection end portion having an asymmetrical refractive index distribution as seen in FIG. 9, when the light $\lambda 1$ and the light $\lambda 2$ inputted to the first optical waveguide 31 are introduced into the intermediate optical waveguide 33 as seen in FIG. 9, light of a high order mode is generated similarly as described hereinabove with reference to FIGS. 1 and 6.

In particular, when the light $\lambda 1$ and the light $\lambda 2$ are introduced into the intermediate optical waveguide 33, electric field peaks corresponding to the light $\lambda 1$ and the light $\lambda 2$ are produced similarly, for example, as seen in FIG. 1, in the intermediate optical waveguide 33. The light $\lambda 1$ and the light $\lambda 2$ propagate meandering in the intermediate optical waveguide 33 such that they may trace the electric field peaks.

As described above, the intermediate optical waveguide 33 realizes its wavelength separation action (filter effect) by setting the length thereof in accordance with the positions of the peaks of the electric fields of lights of a first order mode so that light outputted from the second optical waveguide 32 is branched in accordance with wavelength characteristics thereof and the light $\lambda 1$ is outputted from the optical waveguide 32A of the second optical waveguide 32 while the light $\lambda 2$ is outputted from the optical waveguide 32B of the second optical waveguide 32.

It is to be noted that also the optical waveguide 30 shown in FIG. 9 can be provided with light loss characteristics with respect to the wavelength similar to those described hereinabove with reference to FIG. 5 by such setting of the refractive indices of the first optical waveguide 31 and the second optical waveguide 32 as described above.

In this manner, with the optical waveguide 30 as a third form of the basic structure of the optical waveguide module of the present invention, since the intermediate optical waveguide 33 is formed such that the optical waveguide width thereof is greater than that of the first optical waveguide 31 and the connection end portion 35 of the first optical waveguide 31 to the intermediate optical waveguide 33 is formed as a connection end portion having an asymmetrical refractive index distribution, the propagation loss of light can be eliminated and high order mode light can be propagated in the intermediate optical waveguide 33. Further, since the length of the intermediate optical waveguide 33 is set such that the wavelength of one of the light $\lambda 1$ and the light $\lambda 2$ having different wavelengths which has a longer wavelength is equal to N (N is an arbitrary integer) times the cycle in which the light of the longer wavelength propagates meandering in the intermediate optical waveguide 33 while the wavelength of the other light is equal to N–($\frac{1}{2}$) times the cycle in which the light propagates meandering in the intermediate optical waveguide 33 or such that the wavelength of one of the light $\lambda 1$ and the light $\lambda 2$ which has a shorter wavelength is equal to N (N is an arbitrary integer) times the cycle in which the light propagates meandering in the intermediate optical waveguide 33 while the wavelength of the other light is equal to N+($\frac{1}{2}$) times the cycle in which the light propagates meandering in the intermediate optical waveguide 33, the lights of the different wavelengths can be separated from each other effectively. Consequently, the optical waveguide 30 is advantageous in that it can be constructed as an optical wave branching unit having a high accuracy in optical branching.

Further, the optical waveguide 30 can be produced by such a simple process as described hereinabove with reference to FIGS. 83(a) to 8(f), and no gap need be produced between the waveguides. Consequently, the optical waveguide 30 is advantageous also in that the lights of the different wavelengths can be separated from each other with a high degree of accuracy while suppressing the production cost.

a4. Others

Figure 13:
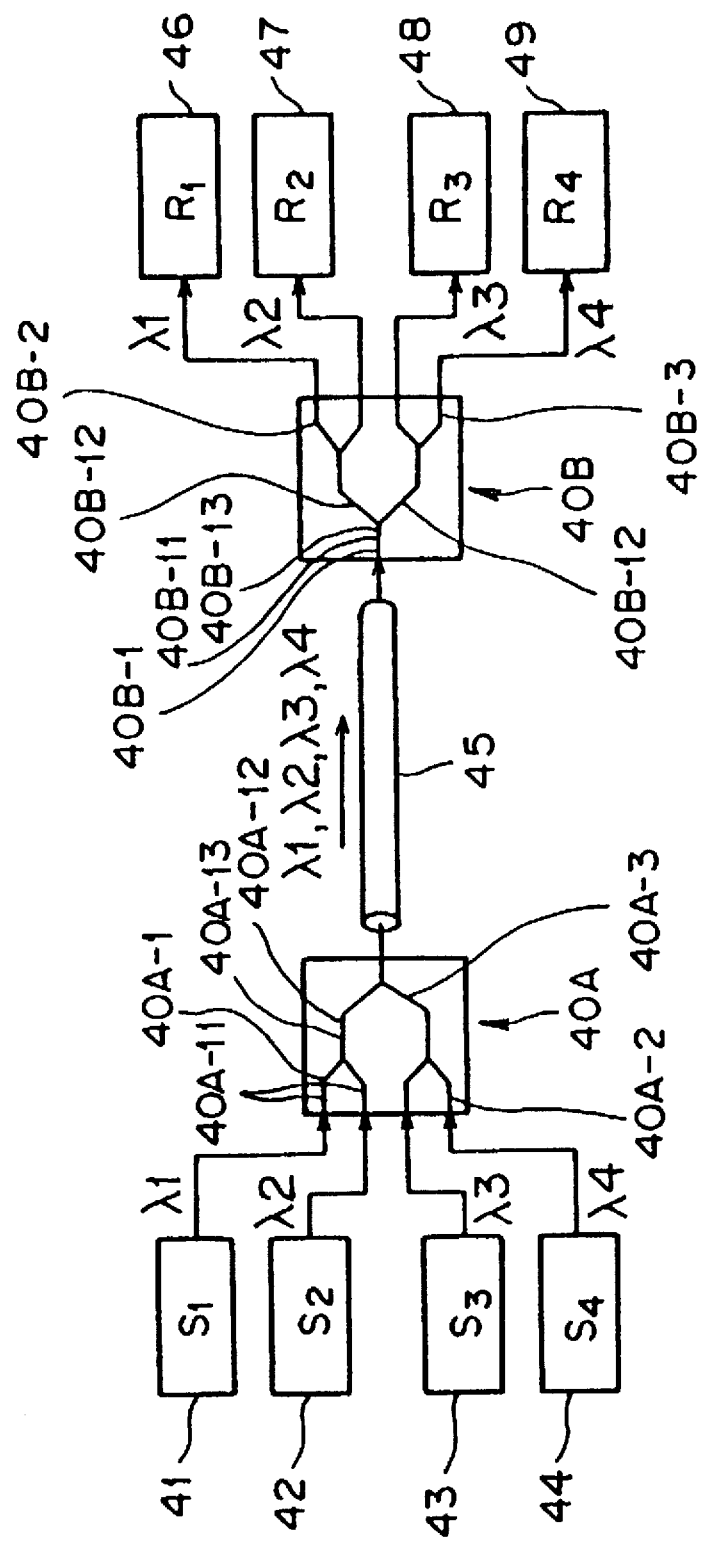
FIG. 13 is a block diagram of an optical multiplex transmission system employing an optical waveguide module to which the present invention is applied.

While the first to third forms (refer to reference numerals 10, 20 and 30) of the basic structure of the optical waveguide module according to the present invention described above are described as principally exhibiting, as an operation thereof, a wavelength separation operation when the optical wavelength module is formed as an optical wave branching unit, each of them may have a reversible operation characteristic and can have an operation as an optical wave combining unit having a reverse function to an optical wave branching unit. In other words, since each of the optical waveguides 10, 20 and 30 described above can at least be produced by a simple process and there is no necessity of forming a gap between waveguides, it is advantageous in that lights of different wavelengths can be combined with a high degree of accuracy while suppressing the production cost.

b. Examples of System Employing Optical Waveguide Module b1. Optical Multiplex Transmission System Employing Optical Waveguide Module FIG. 13 shows in block diagram an optical multiplex transmission system employing an optical waveguide module to which the present invention is applied. Referring to FIG. 13, the optical multiplex transmission system shown includes an optical wave combining unit 40A and an optical wave branching unit 40B connected to each other by means of an optical fiber cable 45.

Any of the optical waveguide modules (refer to reference numerals 10, 20 and 30) of the first to third forms described hereinabove can be used as a basic component of each of the optical wave combining unit 40A and the optical wave branching unit 40B.

The optical multiplex transmission system further includes optical transmitters 41 to 44 which transmit signal lights having different wavelengths $\lambda 1$ to $\lambda 4$ from one another, respectively. The optical wave combining unit 40A receives and combines the signal lights from the optical transmitters 41 to 44 and outputs the combined signal light to the optical fiber cable 45.

The optical wave branching unit 40B receives signal light from the optical wave combining unit 40A via the optical fiber cable 45, branches the received signal light into signal lights of different wavelengths $\lambda 1$ to $\lambda 4$, and outputs the branched signal lights $\lambda 1$ to $\lambda 4$ to optical receivers 46 to 49, respectively.

Consequently, the optical receivers 46 to 49 can receive signal lights $\lambda 1$ to $\lambda 4$ transmitted from the optical transmitters 41 to 44, respectively, via the optical wave combining unit 40A, the optical fiber cable 45 and the optical wave branching unit 40B.

The optical wave combining unit 40A is formed from optical waveguide modules 40A-1, 40A-2 and 40A-3 each having a function as a wave combining unit.

The optical waveguide module 40A-1 includes an input optical waveguide 40A-11 formed from a pair of optical waveguides, an output optical waveguide 40A-12, and an intermediate optical waveguide 40A-13 which interconnects the input optical waveguide 40A-11 and the output optical waveguide 40A-12 and can propagate light of a high order mode. Also the optical waveguide modules 40A-2 and 40A-3 have a similar construction to that of the optical waveguide module 40A-1.

The two optical waveguides of the input optical waveguide (branching optical waveguides) 40A-11 of the optical waveguide module 40A-1 receive signal lights $\lambda 1$ and $\lambda 2$ from the optical transmitters 41 and 42, respectively. Thus, signal light obtained by combining the signal lights $\lambda 1$ and $\lambda 2$ is outputted from the output optical waveguide 40A-12.

Similarly, the optical waveguide module 40A-2 receives signal lights $\lambda 3$ and $\lambda 4$ from the optical transmitters 43 and 44, respectively, and outputs combined signal light of the signal lights $\lambda 3$ and $\lambda 4$.

The output optical waveguide of the optical waveguide module 40A-1 and the output optical waveguide of the optical waveguide module 40A-2 are connected to the two input optical waveguides of the optical waveguide module 40A-3. The output optical waveguide of the optical waveguide module 40A-3 is connected to the optical fiber cable 45.

Consequently, the optical waveguide module 40A-3 further combines combined signal lights from the optical waveguide modules 40A-1 and 40A-2 to obtain signal light in which the signal lights $\lambda 1$ to $\lambda 4$ are combined. The optical waveguide module 40A-3 outputs the resulted combined signal light to the optical fiber cable 45.

The optical wave branching unit 40B includes optical waveguide modules 40B-1, 40B-9, and 40B-3 each having a function of a wave branching unit.

The optical waveguide module 40B-1 includes an input optical waveguide 40B-11, an output optical waveguide 40B-12 formed from a pair of optical waveguides, and an intermediate optical waveguide 40B-13 which interconnects the input optical waveguide 40B-11 and the output optical waveguide 40B-12 and can propagate light of a high order mode therein. Also the optical waveguide modules 40B-2 and 40B-3 have a similar construction to that of the optical waveguide module 40B-1.

The input optical waveguide 40B-11 of the optical waveguide module 40B-1 receives combined signal light of signal lights $\lambda 1$ to $\lambda 4$ from the optical fiber cable 45, and the two optical waveguides of the output optical waveguide (branching optical waveguide) 40B-12 individually output combined signal light of the signal lights $\lambda 1$ and $\lambda 2$ and combined signal light of the signal lights $\lambda 3$ and $\lambda 4$.

An input optical waveguide 40B-21 of the optical waveguide module 40B-2 receives combined signal light of signal lights $\lambda 1$ and $\lambda 2$ from the optical waveguide module 40B-1, and two optical waveguides of an output optical waveguide (branching optical waveguides) 40B-22 individually output the signal lights $\lambda 1$ and $\lambda 2$.

Similarly, an input optical waveguide 40B-31 of the optical waveguide module 40B-3 receives combined signal light of signal lights $\lambda 3$ and $\lambda 4$ from the optical waveguide module 40B-1, and two optical waveguides of an output optical waveguide (branching optical waveguides) 40B-32 individually output the signal lights $\lambda 3$ and $\lambda 4$.

Further, the two output optical waveguides of the optical waveguide module 40B-1 are connected to the input optical waveguides of the optical waveguide modules 40B-2 and 40B-3, whose output optical waveguides are connected to the optical receivers 46 to 49, respectively.

The optical multiplex transmission system employing an optical waveguide module and having the construction described above with reference to FIG. 13 operates in the following manner.

in particular, when signal lights $\lambda 1$ to $\lambda 4$ are outputted from the optical transmitters 41 to 44, respectively, they are inputted to the optical wave combining unit 40A. The optical waveguide module 40A-1 of the optical wave combining unit 40A combines the signal lights $\lambda 1$ and $\lambda 2$ while the optical waveguide module 40A-2 combines the signal lights $\lambda 3$ and $\lambda 4$.

The combined signal light from the optical waveguide module 40A-1 and the combined signal light from the optical waveguide module 40A-2 are inputted to the two input optical waveguides of the optical waveguide module 40A-3. The optical waveguide module 40A-3 further combines the inputted signal lights and outputs combined signal light of the signal lights $\lambda 1$ to $\lambda 4$ to the optical fiber cable 45.

The combined signal light of the signal lights $\lambda 1$ to $\lambda 4$ propagated in the optical fiber cable 45 is inputted to the optical wave branching unit 40B. The optical waveguide module 40B-1 of the optical wave branching unit 40B branches the received light in accordance with the wavelength characteristics of the individual light components and outputs combined signal light of the signal lights $\lambda 1$ and $\lambda 2$ and combined signal light of the sign al lights $\lambda 3$ and $\lambda 4$ from the two output optical waveguides thereof.

The optical waveguide module 40B-2 branches the combined light of the signal lights $\lambda 1$ and $\lambda 2$ inputted thereto in accordance with the wavelength characteristics of the individual signal light components and outputs the branched signal lights $\lambda 1$ and $\lambda 2$ to the optical receivers 46 and 47, respectively, from the two output optical waveguides thereof.

Similarly, the optical waveguide module 40B-3 branches the combined light of the signal lights $\lambda 3$ and $\lambda 4$ in accordance with the wavelength characteristics of the signal lights and outputs the branched signal lights $\lambda 3$ and $\lambda 4$ to the optical receivers 48 and 49, respectively, from the two output optical waveguides thereof. Consequently, the optical receivers 46 to 49 receive the signal lights $\lambda 1$ to $\lambda 4$, respectively.

Where an optical multiplex transmission system is constructed using an optical wave branching unit constructed in a simple construction using an optical waveguide module, since the optical wave branching unit can be constructed so that it can perform wavelength separation with a high degree of accuracy with the propagation loss of light therein reduced, the optical multiplex transmission system is advantageous in that it can be realized with a high performance.

The optical multiplex transmission system is advantageous also in that it can perform wavelength separation also of light including a plurality of light components having different wavelengths with a high degree of accuracy.

Figure 14:
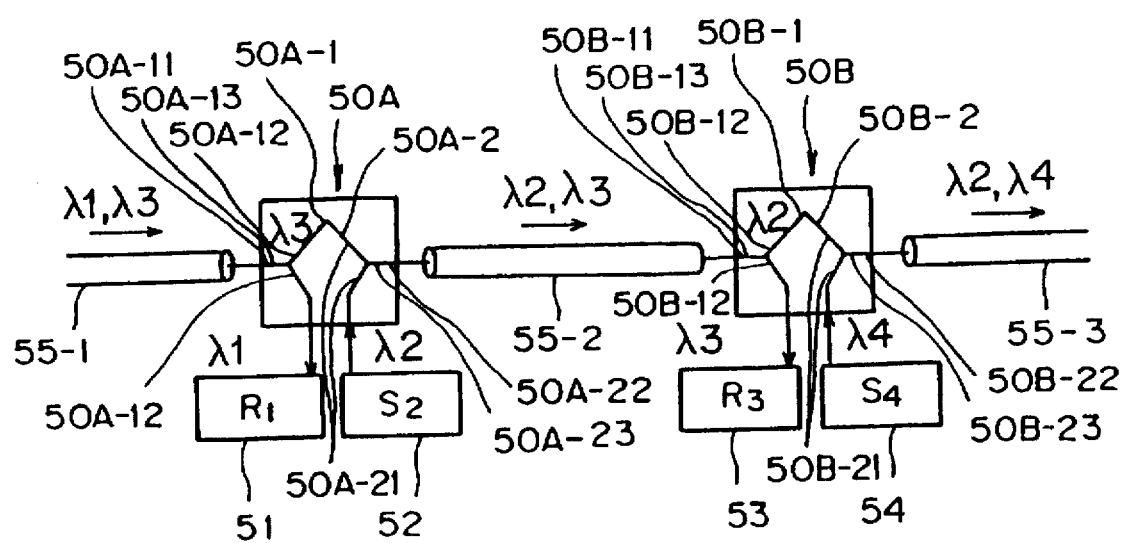
FIG. 14 is a similar view but showing an optical branching insertion transmission system employing an optical waveguide module to which the present invention is applied.

It is to be noted that, while the optical wave combining unit 40A in the optical multiplex transmission system described above has a pyramid construction of two stages formed from the optical waveguide modules 40A-1 to 40A-3 and the optical wave branching unit 40B has a pyramid construct ion of two stages formed from the optical waveguide modules 40B-1 to 40B-3, the optical multiplex transmission system of the present invention is not limited to that of the specific construction, and each of the optical wave combining unit 40A and the optical wave branching unit 40B may have a pyramid construction of more than two stages. This allows construction of a wave branching unit or a wave combining unit which can branch or combine a greater number of signal lights which are classified in terms of the wavelength.

b2. Optical Branching Insertion Transmission System Employing Optical Waveguide Module FIG. 14 shows in block diagram an optical branching insertion transmission system employing an optical waveguide module to which the present invention is applied. Referring to FIG. 14, the optical branching insertion transmission system shown includes a pair of optical wave combining and branching units 50A and 50B. Also each of the optical wave combining and branching units 50A and 50B can employ, as a basic component thereof, any one of the optical waveguide modules (refer to reference numerals 10, 20 and 30) of the first to third forms described hereinabove.

The optical wave combining and branching unit 50A is interposed between an optical fiber cable 55-1 and another optical fiber cable 55-2 and accommodates an optical receiver 51 and an optical transmitter 52. The optical wave combining and branching unit 50A includes an optical waveguide module 50A-1 and another optical waveguide module 50A-2.

The optical waveguide module 50A-1 includes an input optical waveguide 50A-11, an output optical waveguide 50A-12 formed from a pair of optical waveguides, and an intermediate optical waveguide 50A-13 which interconnects the input optical waveguide 50A-11 and the output optical waveguide 50A-12 and can propagate light of a high order mode therein.

The optical waveguide module 50A-2 includes an input optical waveguide 50A-21 formed from a pair of optical waveguides, an output optical waveguide 50A-22, and an intermediate optical waveguide 50A-23 which interconnects the input optical waveguide 50A-21 and the output optical waveguide 50A-22 and can propagate light of a high order mode therein.

One of the two optical waves of the output optical waveguide 50A-12 of the optical waveguide module 50A-1 and one of the two optical waveguides of the input optical waveguide 50A-21 of the optical waveguide module 50A-2 are connected to each other while the other optical waveguide of the output optical waveguide 50A-12 of the optical waveguide module 50A-1 is connected to the optical receiver 51 and the other optical waveguide of the input optical waveguide 5A-21 of the optical waveguide module 50A-2 is connected to the optical transmitter 52.

combined light of signal lights λ1 and λ3 from the optical fiber cable 55-1 is inputted to the optical waveguide module 50A-1 of the optical wave combining and branching unit 50A and branched into the signal lights λ1 and λ3 by the optical waveguide module 50A-1. The thus branched signal light λ1 is outputted to the optical receiver 51. Meanwhile, the optical waveguide module 50A-2 combines signal light λ2 from the optical transmitter 52 and the other branched signal light from the optical waveguide module 50A-1 and outputs resulted combined signal light to the optical fiber cable 55-2.

Similarly, the optical wave combining and branching unit 50B is interposed between the optical fiber cable 55-2 and a further optical fiber cable 55-3 and accommodates an optical receiver 53 and an optical transmitter 54. The optical wave combining and branching unit 50B includes an input optical waveguide 50B-1 and another optical waveguide module 50B-2.

The input optical waveguide 50B-1 includes an input optical waveguide 50B-11, an output optical waveguide 50B-12 formed from a pair of optical waveguides, and an intermediate optical waveguide 50B-13 which interconnects the input optical waveguide 50B-11 and the output optical waveguide 50B-12 and can propagate light of a high order mode therein.

The optical waveguide module 50B-2 includes an in put optical waveguide 50B-21 formed from a pair of optical waveguides, an output optical waveguide 50B-22, and an intermediate optical waveguide 50B-23 which interconnects the input optical waveguide 50B-21 and the output optical waveguide 50B-22 and can propagate light of a high order mode therein.

One of the optical waveguides of the output optical waveguide 50B-12 of the input optical waveguide 50B-1 and one of the optical waveguides of the input optical waveguide 50B-21 of the optical waveguide module 50B-2 are connected to each other. The other optical waveguide of the output optical waveguide 50B-12 of the input optical waveguide 50B-1 is connected to the optical receiver 53 while the other optical waveguide of the input optical waveguide 50B-21 of the optical waveguide module 50B-2 is connected to the optical transmitter 54.

Consequently, the input optical waveguide 50B-1 of the optical wave combining and branching unit 50B receives and branches combined light of signal lights λ2 and λ3 from the optical fiber cable 55-2 into the signal tights λ2 and λ3, and outputs the branched signal light λ3 to the optical receiver 53. The optical waveguide module 50B-2 combines signal light λ4 from the optical transmitter 54 and the other signal light λ2 branched by the input optical waveguide 50B-1 and outputs resulted combined signal light to the optical fiber cable 55-3.

The optical branching insertion transmission system employing an optical waveguide module and having the construction described above with reference to FIG. 14 operates in the following manner.

When combined signal light of signal lights λ1 and λ3 is introduced from the optical fiber cable 55-1 into the input optical waveguide 50A-11 of the optical waveguide module 50A-1 forming the optical wave combining and branching unit 50A, the optical waveguide module 50A-1 branches the inputted combined signal light into the signal light λ1 and the signal light λ3 in accordance with wavelength characteristics of the lights and outputs the signal light λ1 to the optical receiver 51 while it outputs the other signal light λ3 to the input optical waveguide 50A-21 of the optical waveguide module 50A-2.

When signal light λ2 is inputted from the optical transmitter 52 to the input optical waveguide 50A-21 of the optical waveguide module 50A-2, the optical waveguide module 50A-2 combines the signal light λ3 from the optical waveguide module 50A-1 and the signal light λ2 from the optical transmitter 52 and outputs resulted combined signal light from the output optical waveguide 50A-22 to the optical fiber cable 55-2.

The combined signal light of the signal light λ2 and the signal light λ3 propagates in the optical fiber cable 55-2 and is introduced into the input optical waveguide 50B-11 of the input optical waveguide 50B-1 forming the optical wave combining and branching unit 50B. Upon reception of the combined signal light, the input optical waveguide 50B-1 branches it into the signal light λ2 and the signal light λ3 in accordance with wavelength characteristics of the lights. The signal light λ3 is inputted from one of the two optical waveguides of the output optical waveguide 50B-12 to the optical receiver 53 while the signal light λ2 is inputted from the other optical waveguide of the output optical waveguide 50B-12 to one of the optical waveguides of the input optical waveguide 50B-21 of the optical waveguide module 50B-2.

Further, when signal light λ4 from the optical transmitter 54 is introduced into the other optical waveguide of the input optical waveguide 50B-21 of the optical waveguide module 50B-2, the optical waveguide module 50B-2 combines the signal light λ2 from the input optical waveguide 50B-1 and the signal light λ4 from the optical transmitter 54 and outputs resulted combined signal light from the output optical waveguide 50B-22 to the optical fiber cable 55-3.

Figure 15:
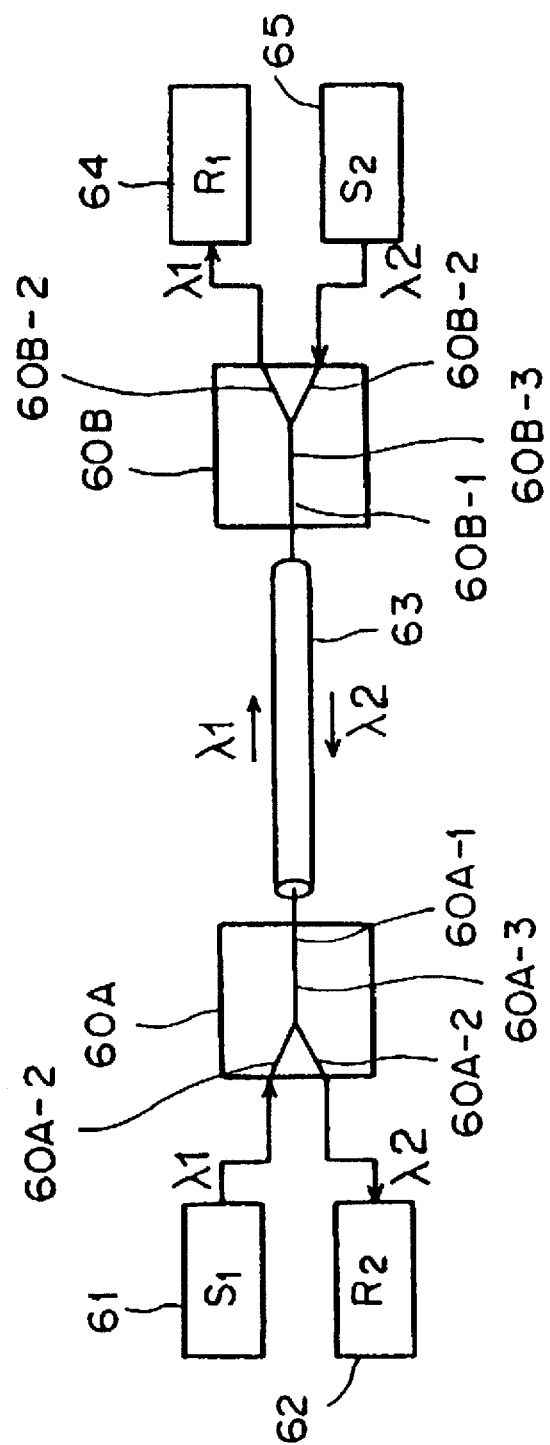
FIG. 15 is a similar view but showing an optical bidirectional transmission system employing an optical selector to which the present invention is applied.
Figure 16:
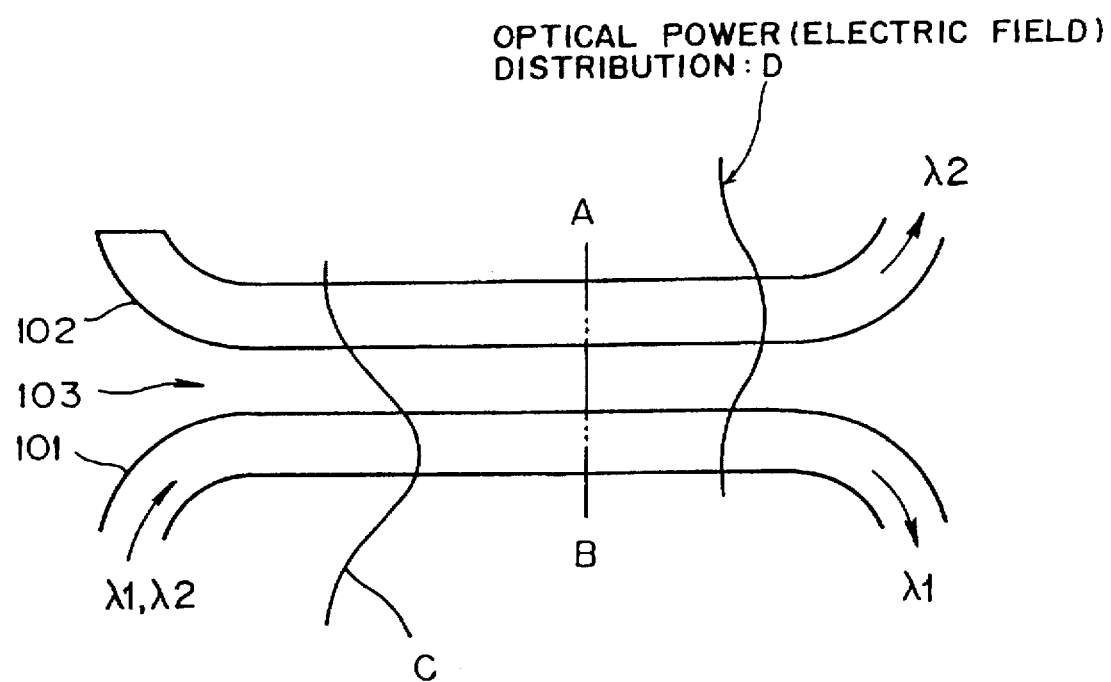
FIG. 16 is a schematic view showing an ordinary directional coupler as an optical waveguide module.
Figure 17:
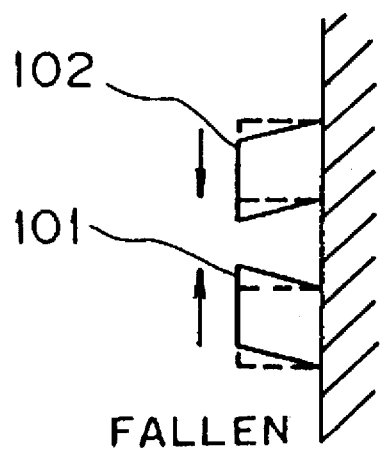
FIG. 17 is a sectional view taken along line A–B of FIG. 16.

By such a simple construction of the optical branching insertion optical system as shown in FIG. 14 wherein it employs an optical waveguide module, the optical branching insertion optical system can be constructed as an optical wave combining and branching unit which can perform wavelength branching or combining with a high degree of accuracy. Consequently, the optical branching insertion optical system is advantageous in that it can be realized with a high performance.

b3. Optical Bidirectional Transmission System Employing Optical Waveguide Module FIG. 15 shows in block diagram an optical bidirectional transmission system employing an optical selector to which the present invention is applied. Referring to FIG. 15, the optical bidirectional transmission system shown includes a pair of optical selectors 60A and 60B. Also each of the optical selectors 60A and 60B can employ, as a basic component thereof, any one of the optical waveguide modules (refer to reference numerals 10, 20 and 30) of the first to third forms described hereinabove.

The optical selector 60A accommodates an optical transmitter 61 for transmitting signal light λ1 and an optical receiver 62 for receiving signal light λ2. The optical selector 60A includes a first optical waveguide 60A-1, a second optical waveguide 60A-2 formed from a pair of optical waveguides one of which is formed as an input side optical waveguide and the other of which is formed as an output side optical waveguide, and an intermediate optical waveguide 60A-3 which interconnects the first optical waveguide 60A-1 and the second optical waveguide 60A-2 arid can propagate light of a high order mode therein.

The optical selector 60B accommodates an optical receiver 64 for transmitting signal light λ1 and an optical transmitter 65 for receiving signal light λ2.

The optical selector 60B includes a first optical waveguide 60B-1, a second optical waveguide 60B-2 formed from a pair of optical waveguides one of which is formed as an input side optical waveguide and the other of which is formed as an output side optical waveguide, and an intermediate optical waveguide 60B-3 which interconnects the first optical waveguide 60B-1 and the second optical waveguide 60B-2 and can propagate light of a high order mode therein.

The input side optical waveguide of the second optical waveguide 60A-2 of the optical selector 60A and the optical transmitter 61 are connected to each other while the output side optical waveguide of the second optical waveguide 60A-2 and the optical receiver 62 are connected to each other. Further, the output side optical waveguide of the second optical waveguide 60B-2 of the optical selector 60B and the optical receiver 64 are connected to each other while the input side optical waveguide of the second optical waveguide 60B-2 and the optical transmitter 65 are connected to each other.

The first optical waveguide 60A-1 of the optical selector 60A and the first optical waveguide 60B-1 of the optical selector 60B are connected to each other by an optical fiber cable 63. Consequently, signal light λ1 from the optical transmitter 61 is received by the optical receiver 64 via the optical selector 60A, the optical fiber cable 63, and the optical selector 60B, and signal light λ2 from the optical transmitter 65 is received by the optical receiver 62 via the optical selector 60B, the optical fiber cable 63, and the optical selector 60A.

The optical bidirectional transmission system employing an optical waveguide module and having the construction described above with reference to FIG. 15 operates in the following manner.

When signal light λ1 from the optical transmitter 61 is inputted to the input side optical waveguide of the second optical waveguide 60A-2 of the optical selector 60A, it is introduced into the first optical waveguide 60B-1 of the optical selector 60B successively passing the intermediate optical waveguide 60A-3 of the optical selector 60A, the first optical waveguide 60A-1 and the optical fiber cable 63. Then, the signal light λ1 is outputted to the optical receiver 64 successively passing the intermediate optical waveguide 60B-3 of the optical selector 60B and the output side optical waveguide of the second optical waveguide 60B-2.

On the other hand, when signal light λ2 is introduced from the optical transmitter 65 into the input side optical waveguide of the second optical waveguide 60B-2 of the optical selector 60B, it is introduced into the first optical waveguide 60A-1 of the optical selector 60A successively passing the intermediate optical waveguide 60B-3 of the optical selector 60B, the first optical waveguide 60B-1 and the optical fiber cable 63. Then, the signal light λ2 is outputted to the optical receiver 62 successively passing the intermediate optical waveguide 60A-3 of the optical selector 60A and the output side optical waveguide of the second optical waveguide 60A-2.

As described above, by employing an optical selector, the optical bidirectional transmission system which can perform bidirectional optical transmission using the single optical fiber cable 63 can be realized with a simple construction. Further, since the optical selector minimizes the propagation loss of light and eliminates a mutual influence of signal lights of the opposite directions on each other, wavelength selection can be achieved width a high degree of accuracy. Consequently, the optical bidirectional transmission system is advantageous in that it can communicate signal light with a high degree of accuracy.

The present invention is not limited to the specifically described embodiment, and variations and modifications may be made without departing from the scope of the present invention.

What is claimed is:

1. An optical waveguide structure, comprising:
    a first optical waveguide;
    second optical waveguide including a pair of optical waveguides; and
    an intermediate optical waveguide for connecting said first optical waveguide and said second optical waveguide to each other, said intermediate optical waveguide being capable of propagating light of a high order mode therein,
    wherein said first optical waveguide and said intermediate optical waveguide are arranged such that center axes thereof are not aligned with each other.

2. An optical waveguide structure as claimed in claim 1, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

3. An optical waveguide structure as claimed in claim 1, wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

4. An optical waveguide structure, comprising:

a first optical waveguide;

second optical waveguide including a pair of optical waveguides; and an intermediate optical waveguide for connecting said first optical waveguide and said second optical waveguide to each other, said intermediate optical waveguide being capable of propagating light of a high order mode therein, wherein a connection end portion of said first optical waveguide to said intermediate optical waveguide is formed so as to have an asymmetrical refraction index distribution.

5. An optical waveguide structure as claimed in claim 4, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

6. An optical waveguide structure as claimed in claim 4, wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary inter, and the wavelength of the other light is equal to N+½ times the period in which the other light propagates meandering in said intermediate optical waveguide.

7. An optical waveguide structure, comprising:

a first optical waveguide;

a second optical waveguide including a pair of optical waveguides; and an intermediate optical waveguide for connecting said first optical waveguide and said second optical waveguide to each other, said intermediate optical waveguide being capable of propagating light of a high order mode therein, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

8. An optical waveguide structure, comprising:

first optical waveguide;

a second optical waveguide including a pair of optical waveguides; and an intermediate optical waveguide for connecting said first optical waveguide and said second optical waveguide to each other, said intermediate optical waveguide being capable of propagating light of a high order mode therein, wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

9. An optical waveguide structure, comprising:

a first optical waveguide;

second optical waveguide including a pair of optical waveguides; and an intermediate optical waveguide for connecting said first optical waveguide and said second optical waveguide to each other, said intermediate optical waveguide being capable of propagating light of a high order mode therein, wherein said intermediate optical waveguide bas an optical waveguide width greater than that of said first optical waveguide, and wherein said first optical waveguide and said intermediate optical waveguide are arranged such that center axes thereof are not aligned with each other.

10. An optical waveguide structure as claimed in claim 9, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

11. An optical waveguide structure as claimed in claim 9, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

12. An optical waveguide structure as claimed in claim 9, wherein said intermediate optical waveguide is set so that a wavelength of one of two lights inputted to said intermediate optical waveguide from said first optic waveguide and having different wavelengths which has shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

13. An optical waveguide structure, comprising:
a first optical waveguide;
a second optical waveguide including a pair of optical waveguides; and
an intermediate optical waveguide for connecting said first optical waveguide and said second optical waveguide to each other, said intermediate optical waveguide being capable of propagating light of a high order mode therein,
wherein said intermediate optical waveguide has an optical waveguide width greater than that of said first optical waveguide, and
wherein a connection end portion of said first optical waveguide to said intermediate optical waveguide is formed so as to have an asymmetrical refraction index distribution.

14. An optical waveguide structure as claimed in claim 13, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

15. An optical waveguide structure as claimed in claim 13, wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

16. An optical waveguide structure, comprising:
a first optical waveguide;
a second optical waveguide including a pair of optical waveguides; and
an intermediate optical waveguide for connecting said first optical waveguide and said second optical waveguide to each other, said intermediate optical waveguide being capable of propagating light of a high order mode therein,
wherein said intermediate optical waveguide has an optical waveguide width greater than that of said first optical waveguide, and
wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

17. An optical waveguide structure, comprising:
a first optical waveguide;
second optical waveguide including a pair of optical waveguides; and
an intermediate optical waveguide for connecting said first optical waveguide and said second optical waveguide to each other, said intermediate optical waveguide being capable of propagating light of a high order mode therein,
wherein said intermediate optical waveguide has an optical waveguide width greater than that of said first optical waveguide, and
wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

18. An optical waveguide structure, comprising:
a first optical waveguide;
a second optical waveguide including a pair of optical waveguides; and
an intermediate optical waveguide for connecting said first optical waveguide and said second optical waveguide to each other, said intermediate optical waveguide being capable of propagating light of a high order mode therein,
wherein said intermediate optical waveguide has a refractive index higher than that of said first optical waveguide, and
wherein said first optical waveguide and said intermediate optical waveguide are arranged such that center axes thereof are not aligned with each other.

19. An optical waveguide structure as claimed in claim 18, wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

20. An optical waveguide structure, comprising:
a first optical waveguide;
a second optical waveguide including a pair of optical waveguides; and
an intermediate optical waveguide for connecting said first optical waveguide and said second optical waveguide to each other, said intermediate optical waveguide being capable of propagating light of a high order mode therein, wherein said intermediate optical waveguide has a refractive index higher than that of said first optical waveguide, and wherein a connection end portion of said first optical waveguide to said intermediate optical waveguide is formed so as to have an asymmetrical refraction index distribution.

21. An optical waveguide structure as claimed in claim 20, wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

22. An optical waveguide structure as claimed in claim 20, wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

23. An optical waveguide structure, comprising:

a first optical waveguide;

a second optical waveguide including a pair of optical waveguides; and an intermediate optical waveguide for connecting said first optical waveguide and said second optical waveguide to each other, said intermediate optical waveguide being capable of propagating light of a high order mode therein, wherein said intermediate optical waveguide has a refractive index higher than that of said first optical waveguide, and wherein said intermediate optical waveguide is set so that a wavelength of one of two lights inputted to said intermediate optical waveguide from said first optical waveguide and having different wavelengths which has a longer one of the wavelengths is equal to N times a cycle in which the one light propagates meandering in said intermediate optical waveguide, N being an arbitrary integer, and the wavelength of the other light is equal to N−½ times the period in which the other light propagates meandering in said intermediate optical waveguide.

24. An optical waveguide structure, comprising:

first optical waveguide;

second optical waveguide including a pair of optical waveguides; and an intermediate optical waveguide for connecting said first optical waveguide and said second optical waveguide to each other, said intermediate optical waveguide being capable of propagating light of a high order mode therein, wherein said intermediate optical waveguide has a refractive index higher than that of said first optical waveguide, and wherein said intermediate optical waveguide is set so that a wavelength of one of two lights inputted to said intermediate optical waveguide from said first optical waveguide and having different wavelengths which has a shorter one of the wavelengths is equal to N times a cycle in which the one light propagates meandering in said intermediate optical waveguide, N being an arbitrary integer, and the wavelength of the other light is equal to N+½ times the period in which the other light propagates meandering in said intermediate optical waveguide.

* * * * *